US011132552B1

(12) United States Patent
Naslavsky et al.

(10) Patent No.: US 11,132,552 B1
(45) Date of Patent: Sep. 28, 2021

(54) SYSTEM AND METHOD FOR BANDWIDTH REDUCTION AND COMMUNICATION OF VISUAL EVENTS

(71) Applicant: ShipIn Systems Inc., Newton, MA (US)

(72) Inventors: Ilan Naslavsky, Newton, MA (US); Osher Perry, Newton, MA (US); Moran Cohen, Jerusalem (IL); David J. Michael, Waban, MA (US)

(73) Assignee: ShipIn Systems Inc., Newton, MA (US)

( * ) Notice: Subject to any disclaimer, the term of this patent is extended or adjusted under 35 U.S.C. 154(b) by 0 days.

(21) Appl. No.: 17/175,364

(22) Filed: Feb. 12, 2021

(51) Int. Cl.
*G06K 9/00* (2006.01)
*G06T 7/20* (2017.01)
*G06F 3/0482* (2013.01)

(52) U.S. Cl.
CPC ..... *G06K 9/00718* (2013.01); *G06K 9/00744* (2013.01); *G06K 9/00771* (2013.01); *G06T 7/20* (2013.01); *G06F 3/0482* (2013.01); *G06K 2009/00738* (2013.01); *G06T 2207/30248* (2013.01)

(58) Field of Classification Search
CPC ........... G06K 9/00718; G06K 9/00771; G06K 9/00744; G06K 2009/00738; G06T 7/20; G06T 2207/30248; G06F 3/0482
See application file for complete search history.

(56) References Cited

U.S. PATENT DOCUMENTS

| 9,996,749 B2 * | 6/2018 | Bataller | G06K 9/00718 |
|---|---|---|---|
| 2002/0075546 A1 * | 6/2002 | Webb | H04B 10/572 |
| | | | 398/182 |
| 2003/0025599 A1 * | 2/2003 | Monroe | G08B 13/19684 |
| | | | 340/531 |

(Continued)

FOREIGN PATENT DOCUMENTS

CN 210464459 U * 5/2020

OTHER PUBLICATIONS

Translated Version of CN210464459 (Year: 2020).*

*Primary Examiner* — Carol Wang
(74) *Attorney, Agent, or Firm* — Loginov & Associates, PLLC; William A. Loginov

(57) ABSTRACT

This invention provides a system and method that employs reduction in bandwidth and the amount of data stored, along with queuing of data, so that the significant and/or relevant shipboard visual information is detected and communicated continuously from the ship (or other remote vehicle/location) to shore without loss of useful/high-priority information and within the available bandwidth of that typical, available satellite link. The system and method supports remote configuration and management from shore to the ship over the same communications channel but in the reverse direction. The system and method further facilitates the logical summarization of continuous visibility into shipboard activities, shipboard behavior, and shipboard status so that a land/shore-based manager/reviewer/auditor can review, comprehend and synthesize such information, at a glance, using a land-based user interface/dashboard, related to events that have recently transpired on the sailing commercial merchant vessel without the need to review hours/days/weeks of multiple channels of video.

17 Claims, 18 Drawing Sheets

(56) References Cited

U.S. PATENT DOCUMENTS

| | | | |
|---|---|---|---|
| 2004/0008253 A1* | 1/2004 | Monroe | G08B 13/19641 348/143 |
| 2005/0055330 A1* | 3/2005 | Britton | H04L 67/42 |
| 2007/0260363 A1* | 11/2007 | Miller | G06F 16/2379 701/2 |
| 2009/0102950 A1* | 4/2009 | Ahiska | H04N 5/2259 348/240.2 |
| 2018/0239982 A1* | 8/2018 | Rutschman | H04N 5/23299 |
| 2020/0064466 A1* | 2/2020 | Harper | H04W 4/38 |
| 2020/0264268 A1* | 8/2020 | Moore | G06K 9/00771 |
| 2020/0327345 A1* | 10/2020 | Schumacher | B60W 40/10 |

* cited by examiner

SYSTEM AND METHOD FOR BANDWIDTH REDUCTION AND COMMUNICATION OF VISUAL EVENTS

FIELD OF THE INVENTION

This application relates to systems and methods for communicating visual data and related events over a reduced bandwidth communication link, and user interfaces for viewing and manipulating such data and events.

BACKGROUND OF THE INVENTION

International shipping is a critical part of the world economy. Ocean-going, merchant freight vessels are employed to carry virtually all goods and materials between ports and nations. The current approach to goods shipments employs intermodal cargo containers, which are loaded and unloaded from the deck of ships, and are carried in a stacked configuration. Freight is also shipped in bulk carriers (e.g. grain) or liquid tankers (e.g. oil). The operation of merchant vessels can be hazardous and safety concerns are always present. Likewise, passenger vessels, with the precious human cargo are equally, if not more, concerned with safety of operations and adherences to rules and regulations by crew and passengers. Knowledge of the current status of the vessel, crew and cargo can be highly useful in ensuring safe and efficient operation.

In many areas of commercial and/or government activity, visual monitoring (manual and automated surveillance), and other status sensors is employed to ensure safe and rule-conforming operation. These approaches, however, entail the generation and transmission of large volumes of data to a local or remote location, where such data is stored and/or analyzed by management personnel. However, unlike most land-based (i.e. wired, fiber or high-bandwidth wireless) communication links, it is often much more challenging to transmit useful data (e.g. visual information) from ship-to-shore. It can be assumed that ten (10) channels of raw video data are the minimum number needed to provide shipboard visibility and a 5 Mb/s of uplink speed per HD video channel or 50 Mb/s in aggregate is required. Conversely a typical satellite link to/from a ship is $1/200$ or $1/400$ of that size, and transmits only 256 Kb/s or 128 Kb/s.

It is desirable to provide a system and method that enables continuous visibility into the shipboard activities, shipboard behavior, and shipboard status of an at-sea commercial merchant vessel (cargo, fishing, industrial, and passenger). It is further desirable that that the transmitted visual data and associated status be accessible via an interface that aids users in manipulating, organizing and acting upon such information.

SUMMARY OF THE INVENTION

This invention overcomes the disadvantages of the prior art by providing a system and method that employs reduction in bandwidth and the amount of data stored bandwidth, along with queuing of data so that the significant and/or relevant shipboard visual information is detected and communicated continuously from the ship (or other remote vehicle/location) to shore without (free of) the loss of useful/high-priority information and within the available bandwidth of that typical, available satellite link. The system and method supports remote configuration and management from shore to the ship over the same communications channel but in the reverse direction. The system and method further facilitates the logical summarization of continuous visibility into shipboard activities, shipboard behavior, and shipboard status so that a land/shore-based manager/reviewer/auditor can review, comprehend and synthesize such information, at a glance, using a land-based computer graphical user interface (GUI), which can be defined by a dashboard, related to events that have recently transpired on the sailing commercial merchant vessel without the need to review hours/days/weeks of (e.g.) 10+ channels of video. Notably, the system and method effectively provides that visibility to the land-based computer dashboard.

In an illustrative embodiment, a system and method for storage and bandwidth reduction of visual events in association with an activity is provided. At least one visual event detector is provided, and can include at least one camera that acquires images of the activity. At least one processor receives the images and a visual event detection process operates at least in part on the processor that processes the images. A queuing process identifies visual events from the at least one visual event detector and stores the visual events. A communications process enables a reduced-bandwidth communications channel adapted to transmit the stored visual events in a reduced-bandwidth and queued format to a remote location. Illustratively, the visual events can comprise activities related to at least one of bridge operations, cargo operations, maintenance operations, safety operations, and vetting and security with respect to a vessel. The visual events can be based upon software-based and hardware-based event detectors that identify predetermined characteristics within one or more of the images and determine a state based upon the characteristics. The visual events can provide data primitives that are derived into user information, and these data primitives can, thus, include at least one of statistics, pattern matches, metrics and time. The stored visual events can be communicated across the communications channel based upon user-set priorities, wherein higher priority events are communicated first in a queue from the stored visual events. A user interface can display information of the at least one of the bridge operations, cargo operations, maintenance operations, safety operations, and vetting and security at a base location in one or more predetermined presentation formats. The user interface can include inputs that enable the user-set priorities. The user-interface can include inputs that enable adding or setting configuration parameters for the event detectors. The user information can also include at least one of fleet reports on a plurality of vessels associated with the user interface, vessel reports, occurrence of discrete events and occurrence of complex events comprising a plurality of discrete events. The information can be displayed in a dashboard format comprising one or more visual windows, alerts and numerical data.

In an illustrative embodiment, a user interface is provided, which is located at a base location and receives visual events over a communication channel from a remote, moving or stationary object, in which the object includes at least one visual event detector having at least one camera that acquires images of the activity. At least one processor is provided, which receives the images, and a visual event detection process operates, at least in part, on the processor to process the images. A communications process enables a communications channel adapted to transmit the stored visual events in a queued format to the base location. The user interface includes a dashboard for displaying information associated with the object. The user interface enables configurations of at least one of (a) priority of visual events to be communicated over the communications channel and (b) configuration of characteristics associated with the visual events. The communications channel can be a reduced-bandwidth, wireless communications channel. The object can be a sea-going vessel and the visual events can relate to at least one of safety, maintenance, cargo handling, bridge operations, vetting and security relative to the vessel. A dashboard display on the user interface can provide at least one of configuration, status and performance information relative to the vessel. The dashboard display on the user interface can provide at least one of configuration, status and performance information relative to each vessel of a fleet of vessels. Illustratively, the information includes one or more forms of displayed sensor data, having at least one of a label, highlight, comment and annotation visually appended thereto. The information handled and/or displayed by the interface can include a workflow provided between one or more users or vessels. The communication channel can be arranged to transmit control data from the user interface to one or more of the vessels and receive feedback via the user interface relative to actions on the vessel with respect to the control data.

In an illustrative embodiment, a method for storage and bandwidth reduction of visual events in association with an activity is provided. The method acquires images of the activity with at least one camera and performing visual event detection with a processor. Visual events from the at least one visual event detector are identified and stored in a queue based upon predetermined parameters. Communication with a remote location occurs over a reduced-bandwidth communications channel adapted to transmit the stored visual events in a reduced-bandwidth and queued format to the remote location.

BRIEF DESCRIPTION OF THE DRAWINGS

The invention description below refers to the accompanying drawings, of which.

DETAILED DESCRIPTION

I. System Overview

Figure 1:
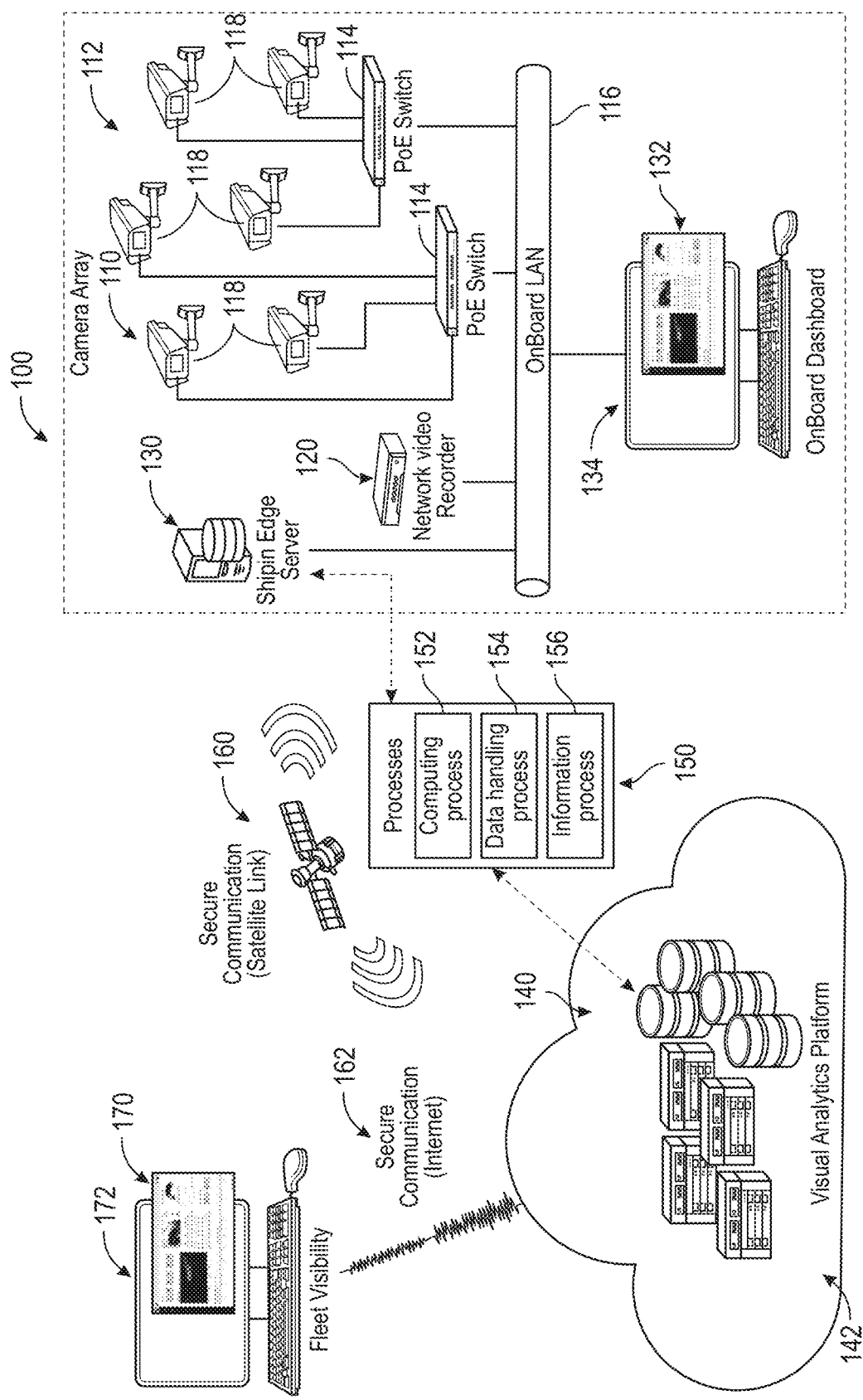
FIG. 1 is a diagram showing an overview of a system and associated method for acquiring, transmitting analyzing and reporting visual and other sensor information with respect to a communication link typically characterized by reduced bandwidth according to an illustrative embodiment.
Figure 1A:
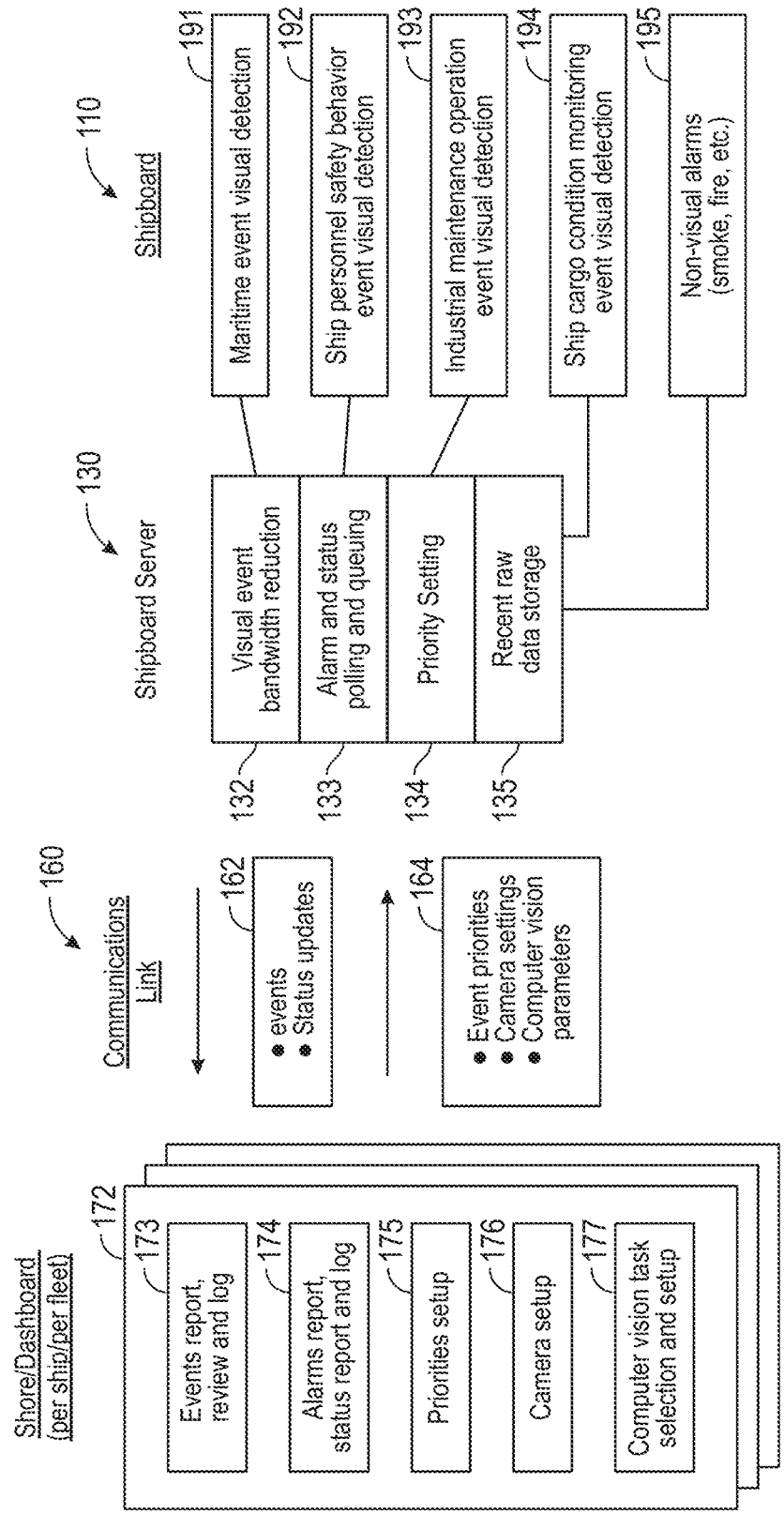
FIG. 1A is a block diagram showing data and operations employed by the system and method of FIG. 1.

FIGS. 1 and 1A show an arrangement 100 for tracking and reporting upon visual, and other, events generated by visual sensors aboard ship that create video data streams, visual detection of events aboard ship based on those video data streams, aggregation of those visual detections aboard ship, prioritization and queuing of the aggregated detections into events, bandwidth reduction of the video data streams in combination with the aggregated events, sending the events over the reduced bandwidth communications channel to shore, reporting the events to a user-interface on shore, and further aggregation of the events from multiple ships and multiple time periods into a fleet-wide aggregation that can present information over time. The system and method herein further provides the ability to configure and setup the system described above to select or not select events for presentation in order to reduce confusion for the person viewing the dashboard as well as to set the priority for communicating particular events or classes of events over the reduced bandwidth communications channel so that the most important events are communicated at the expense of less important events.

FIG. 1, the arrangement 100 particularly depicts a shipboard location 110 includes a camera (visual sensor) array 112 comprising a plurality of discrete cameras 118 (and/or other appropriate environmental/event-driven sensors) that are connected to wired and/or wireless communication links (e.g. that are part of a TCP/IP LAN or other protocol-driven data transmission network 116) via one or more switches, routers, etc. 114. Image (and other) data from the (camera) sensors 118 is transmitted via the network 116. Note that cameras can provide analog or other format image data to a remote receiver that generates digitized data packets for use of the network 116. The cameras 118 can comprise conventional machine vision cameras or sensors operating to collect raw video or digital image data, which can be based upon two-dimensional (2D) and/or three-dimensional (3D) imaging. Furthermore, the image information can be grayscale (monochrome), color, and/or near-visible (e.g. infrared (IR)). Likewise, other forms of event-based cameras can be employed.

Note that data used herein can include both direct feeds from appropriate sensors and also data feeds from other data sources that can aggregate various information, telemetry, etc. For example, location and/or directional information can be obtained from navigation systems (GPS etc.) or other systems (e.g. via APIs) through associated data processing devices (e.g. computers) that are networked with a server 130 for the system. Similarly, crew members can input information via an appropriate user interface. The interface can request specific inputs—for example logging into or out of a shift, providing health information, etc.—or the interface can search for information that is otherwise input by crew during their normal operations—for example, determining when a crew member is entering data in the normal course of shipboard operations to ensure proper procedures are being attended to in a timely manner.

The shipboard location 110 can further include a local image/other data recorder 120. The recorder can be a stand-alone unit, or part of a broader computer server arrangement 130 with appropriate processor(s), data storage and network interfaces. The server 130 can perform generalized shipboard, or dedicated, to operations of the system and method herein with appropriate software. The server 130 communicates with a work station or other computing device 132 that can include an appropriate display (e.g. a touchscreen) 134 and other components that provide a graphical user interface (GUI). The GUI provides a user on board the vessel with a local dashboard for viewing and controlling manipulation of event data generated by the sensors 118 as described further below. Note that display and manipulation of data can include, but is not limited to enrichment of the displayed data (e.g. images, video, etc.) with labels, comments, flags, highlights, and the like.

The information handled and/or displayed by the interface can include a workflow provided between one or more users or vessels. Such a workflow would be a business process where information is transferred from user to user (at shore or at sea interacting with the application over the GUI) for action according to the business procedures/rules/policies. This workflow automation is commonly referred to as "robotic process automation."

The processes 150 that run the dashboard and other data-handling operations in the system and method can be performed in whole or in part with the onboard server 130, and/or using a remote computing (server) platform 140 that is part of a land-based, or other generally fixed, location with sufficient computing/bandwidth resources (a base location 142). The processes can generally include 150 a computation process 152 that handles sensor data to meaningful events. This can include machine vision algorithms and similar procedures. A data-handling process 154 can be used to derive events and associated status based upon the events—for example movements of the crew and equipment, cargo handling, etc. An information process 156 can be used to drive dashboards for one or more vessels and provide both status and manipulation of data for a user on the ship and at the base location.

Data is communicated between the ship (or other remote location) 110 and the base 142 occurs over one or more reduced-bandwidth wireless channels, which can be facilitated by a satellite uplink/downlink 160, or another transmission modality—for example, long-wavelength, over-air transmission. Moreover, other forms of wireless communication can be employed such as mesh networks and/or underwater communication (for example long-range, sound-based communication and/or VLF). Note that when the ship is located near a land-based high-bandwidth channel or physically connected by-wire while at port, the system and method herein can be adapted to utilize that high-bandwidth channel to send all previously unsent low-priority events, alerts, and/or image-based information.

The (shore) base server environment 140 communicates via an appropriate, secure and/or encrypted link (e.g. a LAN or WAN (Internet)) 162 with a user workstation 170 that can comprise a computing device with an appropriate GUI arrangement, which defines a user dashboard 172 allowing for monitoring and manipulation of one or more vessels in a fleet over which the user is responsible and manages.

Figure 1B:
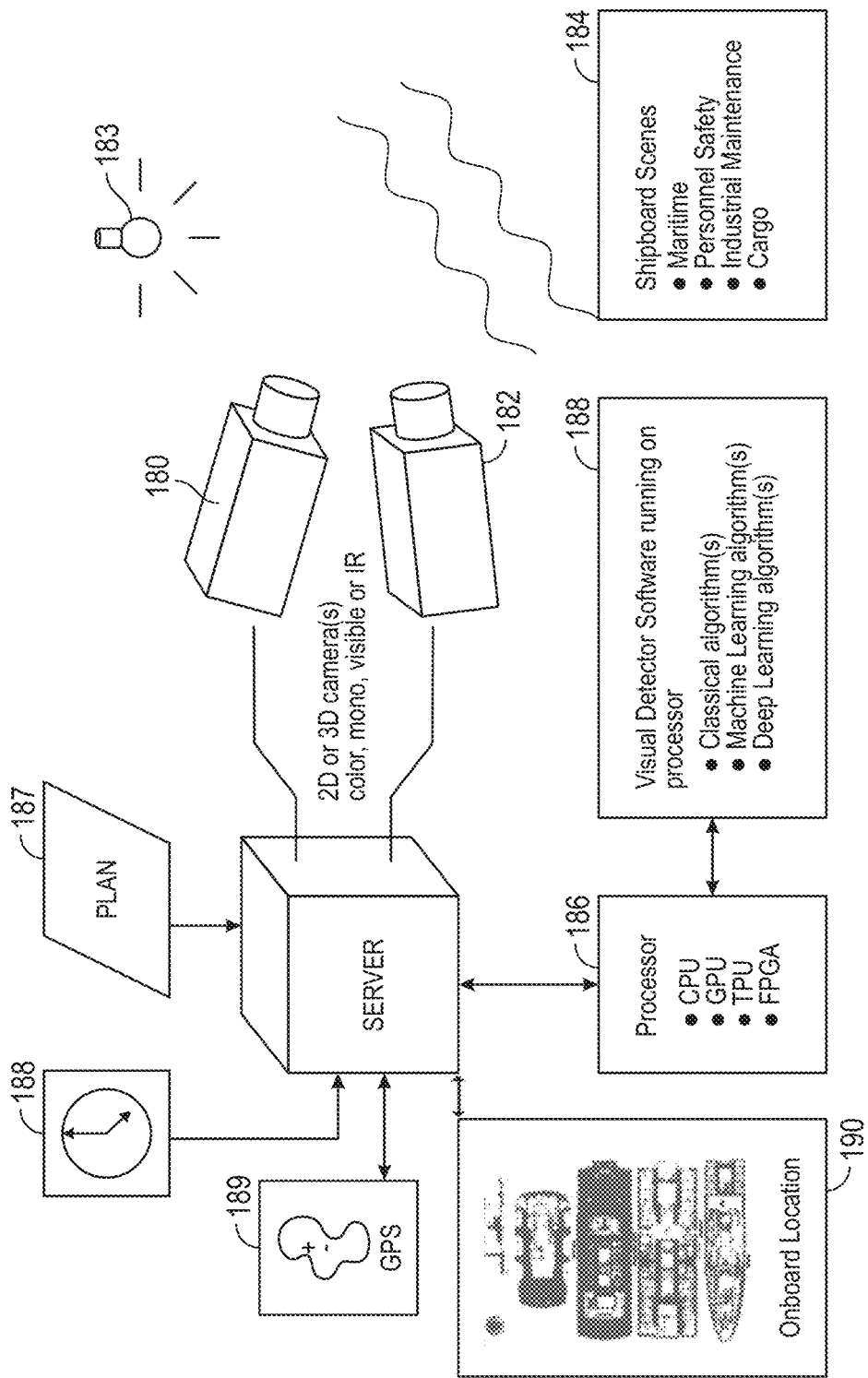
FIG. 1B is a diagram showing acquisition of images and other data for expected event detection according to the system and method of FIG. 1.

Referring further to FIG. 1A, the data handled by the system is shown in further detail. The data acquired aboard the vessel environment 110, and provided to the server 130 can include a plurality of possible, detected visual (and other sensor-based) events. These events can be generated by action of software and/or hardware based detectors that analyze visual images and/or time-sequences of images acquired by the cameras. With further reference to FIG. 1B, visual detection is facilitated by a plurality of 2D and/or 3D camera assemblies depicted as cameras 180 and 182 using ambient or secondary sources of illumination 183 (visible and/or IR). The camera assemblies image scenes 184 located on board (e.g.) a ship. The scenes can relate to, among other subjects, maritime events, personnel safety and/or cargo. The images are directed as image data to the event detection server or processor 186 that also receives inputs from a plan or program 187 that characterizes events and event detection and a clock 188 that establishes a timeline and timestamp for received images. The event detection server or processor 186 can also receive inputs from a GPS receiver 189 to stamp the position of the ship at the time of the event and can also receive input from an architectural plan 190 of the vessel (that maps onboard locations on various decks) to stamp the position of the sensor within the vessel that sent the input. The event server/processor 186 can comprise one or more types and/or architectures of processor(s), including, but not limited to, a central processing unit (CPU—for example one or more processing cores and associated computation units), a graphical processing unit (GPU—operating on a SIMD or similar arrangement), tensor processing unit (TPU) and/or field programmable gate array (FPGA—having a generalized or customized architecture).

Referring again to FIG. 1A, the base location dashboard 172 is established on a per-ship and/or per fleet basis and communicates with the shipboard server 130 over the communications link 160 in a manner that is typically reduced in bandwidth, and possibly intermittent in performing data transfer operations. The link 160 transmits events and status updates 162 from the shipboard server 130 to the dashboard 172 and event priorities, camera settings and vision system parameters 164 from the dashboard 172 to the shipboard server. More particularly, the dashboard displays and allows manipulation of events reports and logs 173, alarm reports and logs 174, priorities for events, etc. 175, camera setup 176 and vision system task selection and setup relevant to event detection, etc. 177. The shipboard server 130 includes various functional modules, including visual event bandwidth reduction 132 that facilitates transmission over the link 160; alarm and status polling and queuing 133 that determines when alarms or various status items have occurred and transmits them in the appropriate priority order; priority setting 134 that selects the priorities for reporting and transmission; and a data storage that maintains image and other associated data from a predetermined time period 135.

Note that, in various embodiments, the bandwidth of the communications link between vessel and base can be limited by external systems such as QoS-quality of service-settings on routers/link OR by the internal system (edge server 130)—for example to limit usage to (e.g.) 15% of total available communication bandwidth. This limitation in bandwidth can be based on a variety of factors, including, but not limited to, the time of day and/or a communications satellite usage cost schedule. An appropriate instruction set can be programmed into the server using conventional or custom control processes. The specific settings for such bandwidth control can also be directed by the user via the GUI.

II. Visual Detectors

As shown in FIG. 1B, various imaged events are determined from acquired image data using appropriate processes/algorithms 188 performed by the processor(s) 186. These can include classical algorithms, which are part of a conventional vision system, such as those available from (e.g.) Keyence, Cognex Corporation, MVTec, or HIKVision. Alternatively, the classical vision system could be based on open source such as OpenCV. Such classical vision systems can include a variety of vision system tools, including, but not limited to, edge finders, blob analyzers, pattern recognition tools, etc. The processor(s) 186 can also employ machine learning algorithms or deep learning algorithms, which can be custom built or commercially available from a variety of sources, and employ appropriate deep-learning frameworks such as caffe, tensorflow, torch, keras and/or OpenCV. The network could be a mask R-CNN or Yolov3 detector. See also URL address https://engineer.dena.com/posts/2019.05/survey-of-cutting-edge-computer-vision-papers-human-recognition/ on the WorldWideWeb.

As shown in FIG. 1A, the visual detectors relate to maritime events 191, ship personnel safety behavior and events 192, maintenance operation and events 193, ship cargo condition and events related thereto 194, and/or non-visual alarms, such as smoke, fire, and/or toxic gas detection via appropriate sensors. By way of non-limiting example, some particular detected events and associated detectors relate to the following:

(a) A person is present at their station at the expected time and reports the station, start time, end time, and elapsed time;

(b) A person has entered a location at the expected time and reports the location, start time, end time, and elapsed time;

(c) A person moved through a location at the expected time and reports the location, start time, end time, and elapsed time;

(d) A person is performing an expected activity at the expected location at the expected time and reports the location, start time, end time, and elapsed time—the activity can include (e.g.) watching, monitoring, installing, hose-connecting or disconnecting, crane operating, tying with ropes;

(e) a person is running, slipping, tripping, falling, lying down, using or not using handrails at a location at the expected time and reports the location, start time, end time, and elapsed time;

(f) A person is wearing or not wearing protective equipment when performing an expected activity at the expected location at the expected time and reports the location, start time, end time, and elapsed time—protective equipment can include (e.g.) a hard-hat, left or right glove, left or right shoe/boot, ear protection, safety goggles, life-jacket, gas mask, welding mask, or other protection;

(g) A door is open or closed at a location at the expected time and reports the location, start time, end time, and elapsed time;

(h) An object is present at a location at the expected time and reports the location, start time, end time and elapsed time—the object can include (e.g.) a gangway, hose, tool, rope, crane, boiler, pump, connector, solid, liquid, small boat and/or other unknown item;

(i) That normal operating activities are being performed using at least one of engines, cylinders, hose, tool, rope, crane, boiler, and/or pump; and (j) That required maintenance activities are being performed on engines, cylinders, boilers, cranes, steering mechanisms, HVAC, electrical, pipes/plumbing, and/or other systems.

Note that the above-recited listing of examples (a j) are only some of a wide range of possible interactions that can for the basis of detectors according to illustrative embodiments herein. Those of skill should understand that other detectable events involving person-to-person, person-to-equipment or equipment-to-equipment interaction are expressly contemplated.

In operation, an expected event visual detector takes as input the detection result of one or more vision systems aboard the vessel. The result could be a detection, no detection, or an anomaly at the time of the expected event according to the plan. Multiple events or multiple detections can be combined into a higher-level single events. For example, maintenance procedures, cargo activities, or inspection rounds may result from combining multiple events or multiple detections. Note that each visual event is associated with a particular (or several) vision system camera(s) 118, 180, 182 at a particular time and the particular image or video sequence at a known location within the vessel. The associated video can be optionally sent or not sent with each event or alarm. When the video is sent with the event or alarm, it may be useful for later validation of the event or alarm. Notably, the discrete images and/or short-time video frame sequences actually represent a small fraction of the video stream, and consequently represent a substantial reduction in the bandwidth required for transmission in comparison to the entire video sequence over the reduced-bandwidth link. Moreover, in addition to compacting the video by reducing it to a few images or short-time sequence, the system can reduce the images in size either by cropping the images down to significant or meaningful image locations required by the detector or by reducing the resolution say from the equivalent of high-definition (HD) resolution to standard-definition (SD) resolution, or below standard resolution.

In addition to reducing bandwidth by identifying events via the vision system and cropping such images where appropriate, the number of image frames can be reduced, in a sequence thereof, by increasing the interval of time between frames. Moreover, bandwidth can be even further reduced using the procedures above, and then subjecting (all on the shipboard server side) the event-centric, cropped, spaced-apart, using commercially available or customized lossy or lossless image compression techniques. Such techniques can include, but are not limited to discrete cosine transform (DCT), run-length encoding (RLE), predictive coding, and/or Lempel-Ziv-Welch (LZW). The images or video sequences NOT associated with visual events may be stored for some period of time on board the vessel.

The shipboard server establishes a priority of transmission for the processed visual events that is based upon settings provided from a user, typically operating the on-shore (base) dashboard. The shipboard server buffers these events in a queue in storage that can be ordered based upon the priority. Priority can be set based on a variety of factors—for example personnel safety and/or ship safety can have first priority and maintenance can have last priority, generally mapping to the urgency of such matters. By way of example, all events in the queue with highest priority are sent first. They are followed by events with lower priority. If a new event arrives shipboard with higher priority, then that new higher priority event will be sent ahead of lower priority events. It is contemplated that the lowest priority events can be dropped if higher priority events take all available bandwidth. The shipboard server receives acknowledgements from the base server on shore and confirms that events have been received and acknowledged on shore before marking the shipboard events as having been sent. Multiple events may be transmitted prior to receipt (or lack of receipt) of acknowledgement. Lack of acknowledgement potentially stalls the queue or requires retransmission of an event prior to transmitting all next events in the priority queue on the server. The shore-based server interface can configure or select the visual event detectors over the communications link. In addition to visual events, the system can transmit non-visual events like a fire alarm signal or smoke alarm signal.

III. Detection Flow

Figure 2:
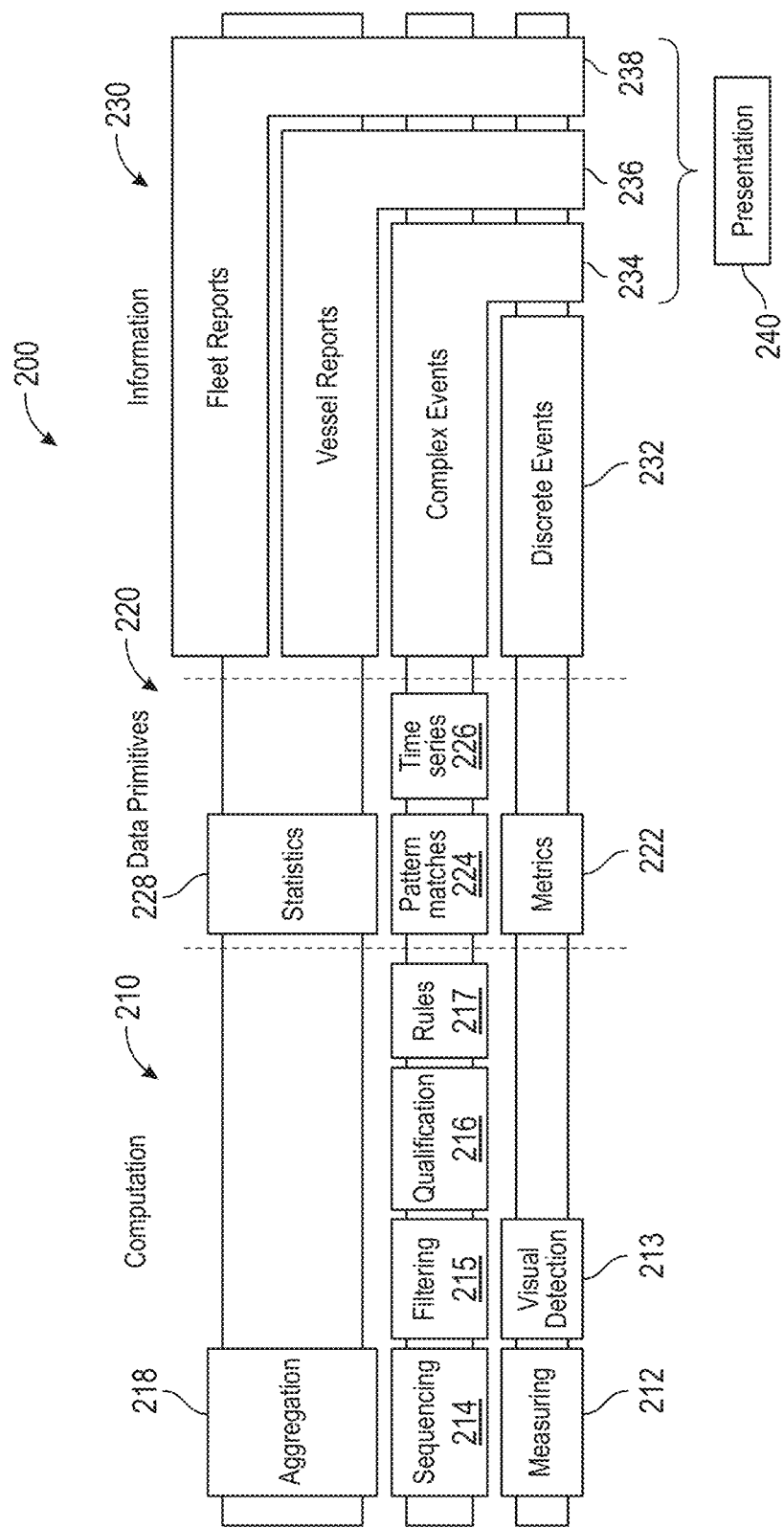
FIG. 2 is a flow diagram showing detection and reporting of visual events and associated data by the processors and processes of the system and method of FIG. 1.

As shown in FIG. 2, an operating procedure 200 for generalized detection flow used in performing the system is shown. The operation can be characterized in three phases or segments, computation 210, generation of data primitives 220 and information creation 230 and presentation 240 to users via the shore-based dashboard. Alternatively, some or all of the functions herein can be implemented by users via a ship-based dashboard, that affects programming on at least one of the local server or the base server. The shipboard dashboard can also act as a passive terminal that transmits instructions back to the base interface over the communications link so that such instructions can be acted upon through the base. The computation phase 210 comprises measurement 212 using sensors and performing visual detection 213. These generate a set of metrics 222 that are displayed to the user as discrete events 232. The computation phase 210 uses event sequencing (priority) 214, filtering (via cropping, compression, etc.), qualification of events 216 based upon rules 217 to provide pattern matches 224 according to a time series of events 226. This data is presented as complex events 234. These complex events 234 can comprise a scenario, such as a maintenance task successfully performed, or the occurrence of a safety breach. The computation phase 210 can aggregate visual and other events 218 and derive statistics 228—for example the number of safety breaches over a time interval, etc. These statistics 228 can be presented to the shore-based user as individual vessel reports 236 and fleet reports 238 that provide valuable information to the user regarding behavior and performance at various factors related to the events in aggregate.

Figure 3:
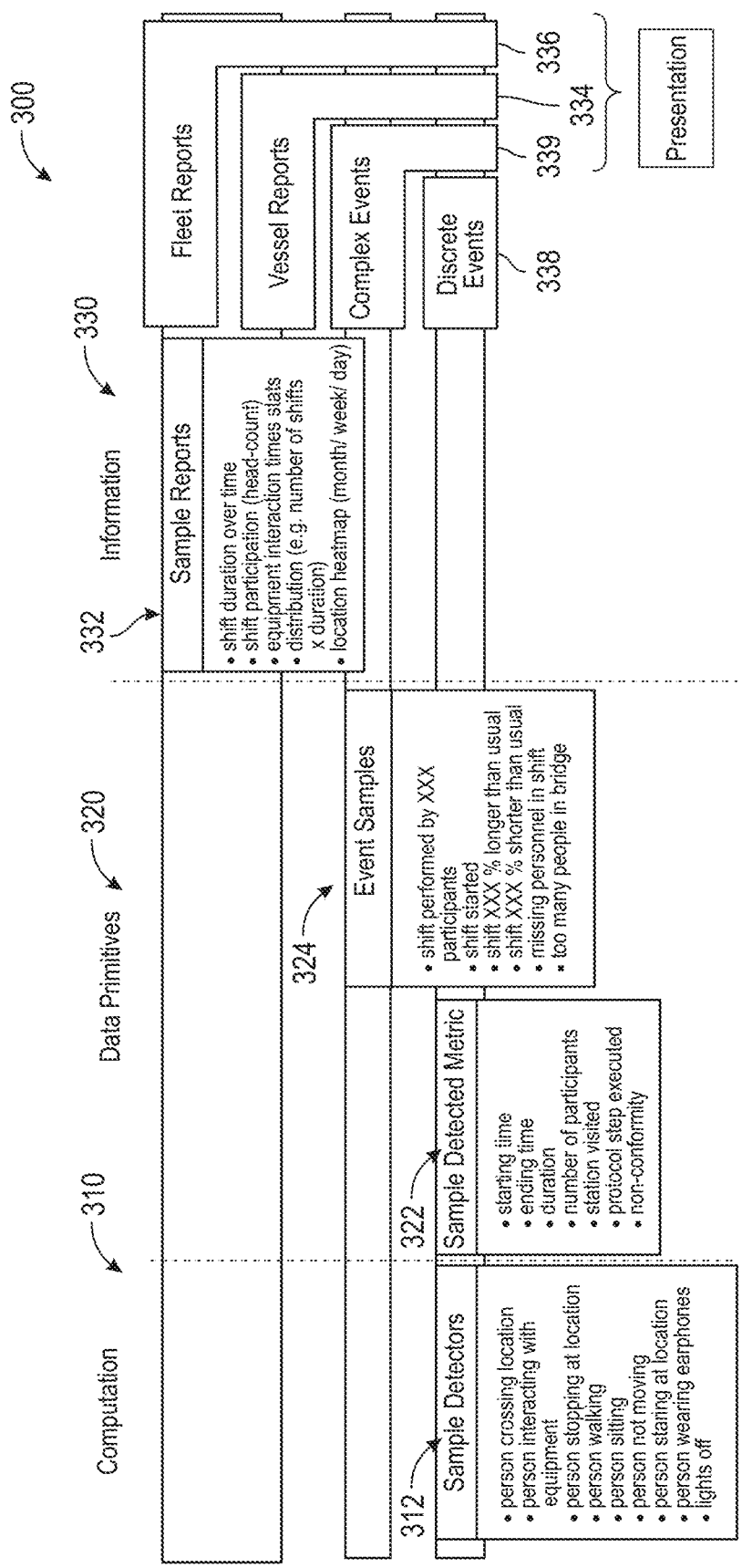
FIG. 3 is a flow diagram showing the detection of visual events using processors and processes of the system and method of FIG. 1 in the example of a bridge routine on a sea-going merchant vessel.

FIG. 3 shows a detection flow procedure 300 in the example of bridge routines for one or more vessels in a fleet. At the computation phase 310, the sample detectors 312 provided by visual and other detectors include (e.g.) a person crossing or stopping at a location, a person interacting with equipment, a person walking, sitting, not-moving (stationary), a person staring at a location, a person wearing earphones and/or lights off at the location. In the associated data primitives generation phase 320, sample detected metrics 322 are provided, including (e.g.) starting time and ending time, duration, number of participants, the bridge station visited, a protocol step executed and a non-conformity with protocols. Event samples 324 can include participant name(s) identified as performing the shift, when the shift started, whether a given participant's shift was longer or shorter than normal, missing personnel and/or excess/ unauthorized personnel on the bridge. In the exemplary information phase sample reports 332 are created that can include (e.g.) shift duration over time, shift participation (head count), equipment interaction time statistics, distribution—for example number of shifts X duration and a location graph (e.g. a heatmap) that can be based upon month, week, day, etc. In the information phase 330, the sample reports 332 can be presented as vessel reports 334 and fleet reports. Sample detected metrics 322 and event samples 324 can be presented to the user as discrete events 338 and complex events 339.

Figure 4:
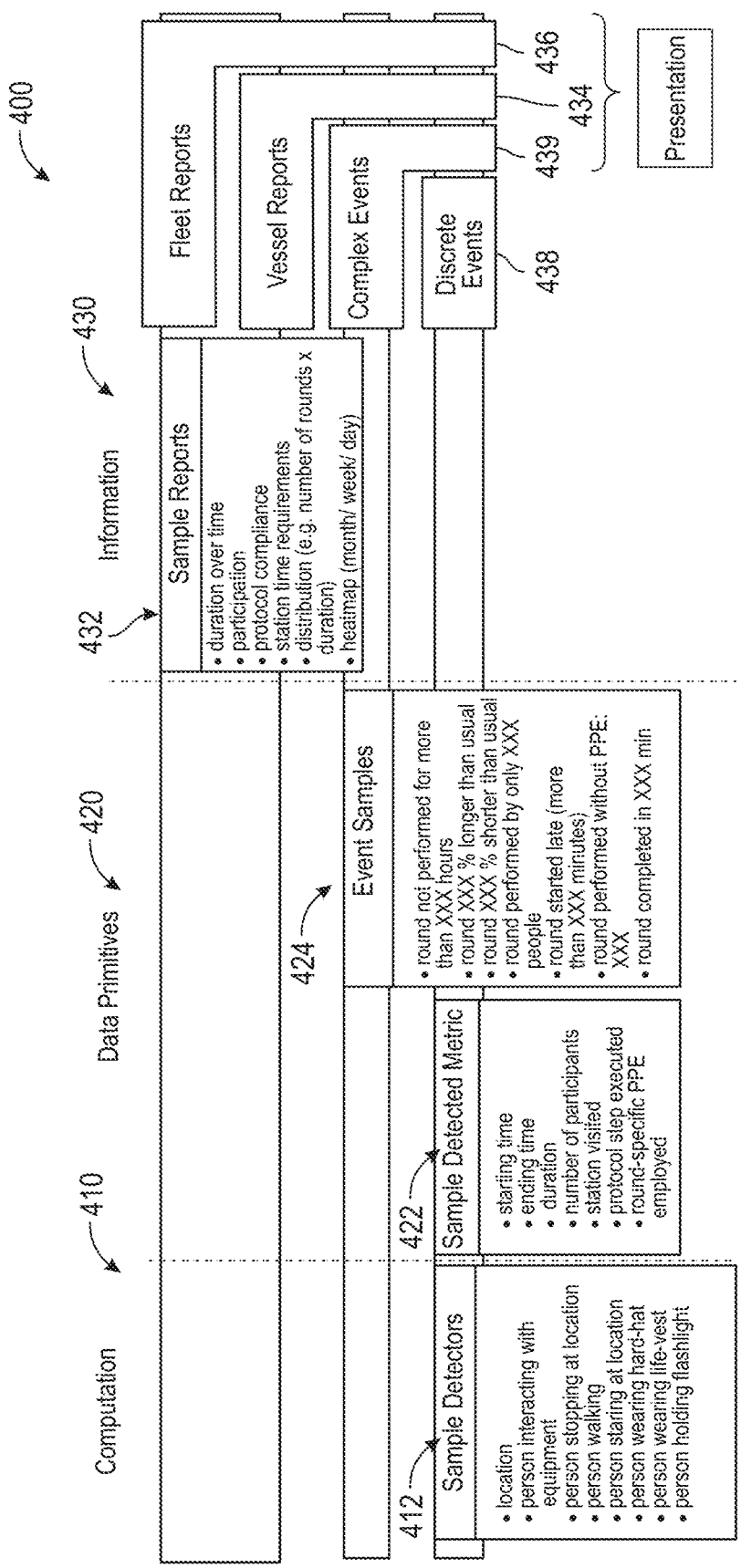
FIG. 4 is a flow diagram showing the detection of visual events using processors and processes of the system and method of FIG. 1 in the example of the performance of safety rounds by personnel (crew) on a sea-going merchant vessel.

FIG. 4 shows a detection flow procedure 400 in the example of safety rounds for one or more vessels in a fleet. At the computation phase 410, the sample detectors 412 provided by visual and other detectors include (e.g.) the location of the event, person interacting with equipment, person stopping at a location, person walking or staring at a location, person wearing a hard-hat, life vest or other protective equipment and/or holding a safety tool, such as a fire extinguisher, flashlight, etc. In the data primitives phase 420 sample detected metrics can include (e.g.) starting or ending time of an event, duration, number of participants, station visited protocol step executed and/or round-specific protective equipment (PPE) employed. Event samples 424 can include whether a safety round was not performed for a predetermined number of hours and a round taking X % more or less time than normal, a round performed by X number of personnel, a round started late by X minutes, a round performed without needed PPE and/or a round completed in X minutes. The information phase 432 provides sample reports 432, based upon events, including duration over time, participation, safety protocol compliance, station time requirements, distribution (e.g. number of rounds X duration) and/or a graph/heat map based upon month, day, week, etc. Vessel reports 434 and fleet reports 436. The information phase 430 also reports discrete events 438 and complex events 439 based upon sample detected events 422 and event samples 424.

Figure 5:
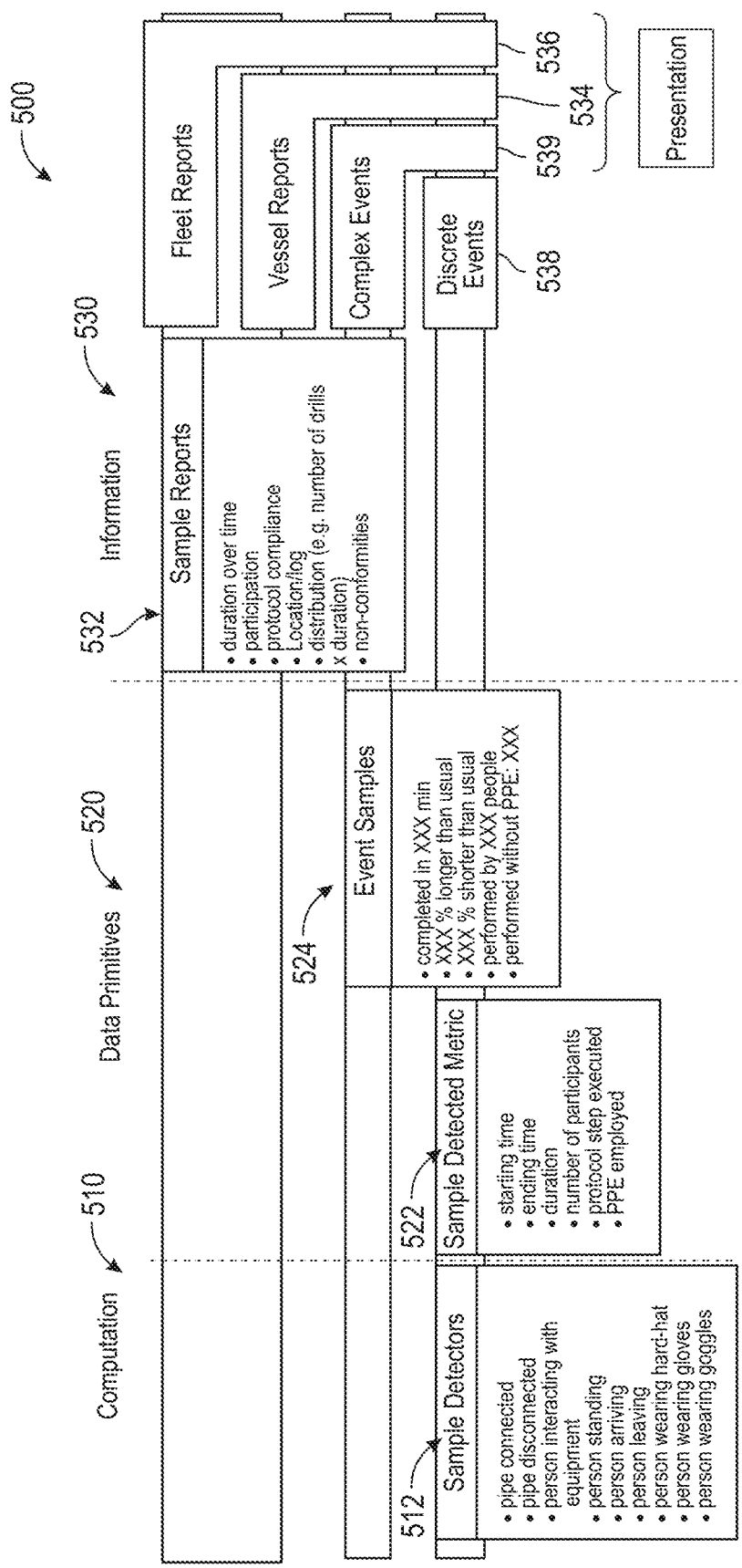
FIG. 5 is a flow diagram showing the detection of visual events using processors and processes of the system and method of FIG. 1 in the example of performing activities with respect to cargo handling on a sea-going merchant vessel.

FIG. 5 shows a detection flow procedure 500 in the example of cargo operations for one or more vessels in a fleet. At the computation phase 510, sample detectors 512 can include a pipe connected, a pipe disconnected, a person interacting with equipment, a person standing, arriving or leaving, a person wearing a hard-hat, gloves, goggles and/or other PPE. The data primitives phase 520 provides sample detected metrics 522 include starting and ending time, duration number of personnel participating, a protocol step executed and/or PPE employed in the task(s). Event samples 524 can include a task complete in X minutes, task completion X % larger or shorter than usual, the task performed by X personnel and/or a task performed without (free of) PPE of X type. In the information phase 530 sample reports 532 can include duration over time, participation, protocol compliance, location/log, distribution (e.g. number of drills X duration) and/or non-conformities versus normal/standard operation. These can be presented as vessel reports 534 or fleet reports 536. Sample detected metrics 522 and event samples 524 are reported as discrete events 538 and complex events 539.

Other exemplary detection flows can be provided as appropriate to generate desired information on activities of interest by the ship's personnel and systems. Such detection flows employ relevant detector types, parameters, etc.

IV. User Interface Dashboard

A. Status and Performance

Figure 6:
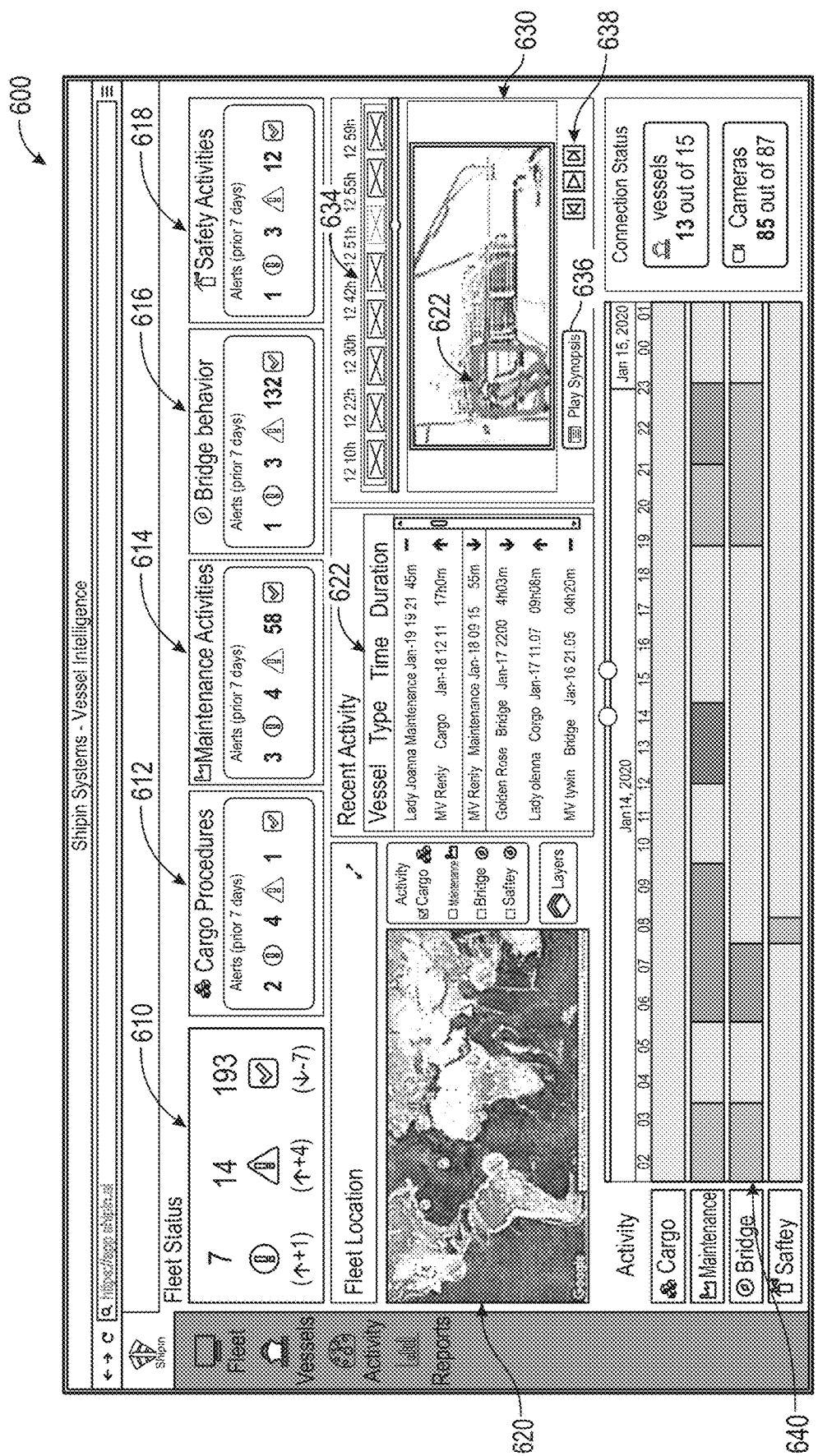
FIG. 6 is a diagram showing an exemplary graphical user interface (GUI) displayed by a processor and associated process in the system and method of FIG. 1, depicting an exemplary dashboard of vessel fleet activity and status.

FIG. 6 shows a display of an exemplary fleet dashboard 600 that can provide a user with all key information in a single display screen (which can be a single or multiple physical displays in a console arrangement). The exemplary display 600 can include a plurality of windows and numerical fields that provide the user with an interactive experience. For example, an overall fleet status window 610 with alarms (e.g. red circle), cautions (e.g. yellow triangle) and all clear conditions (e.g. green square) is shown. Clicking can allow a drill-down to other specific windows. Similar status windows are provided across the top for cargo procedures 612, maintenance activities 614, bridge behavior 616 and safety activities 618. A world (or selectable smaller region) map 620 is provided with flags for vessel locations within the fleet. Locations can be established using GPS and other appropriate location technologies. A listing of recent activity 622 is also provided in the center of the display 600. A visual window 630 is shown with a selected event of interest (e.g. a most-recent event). In this case, the event displays a location on the ship and highlights 632 a person or other relevant activity. A film strip 634 can be provided (e.g. above or below the window 630) to allow selection of events—for example in a time sequence. A synopsis of events can be played using the button 636, and/or other play/pause buttons can be used to replay visual events. A shaded or colored (e.g. heat map) graph can be provided relative to a (e.g.) horizontal time base to show status and/or activities at a fleet level for each category—cargo, maintenance, bridge operations and safety.

Figure 7:
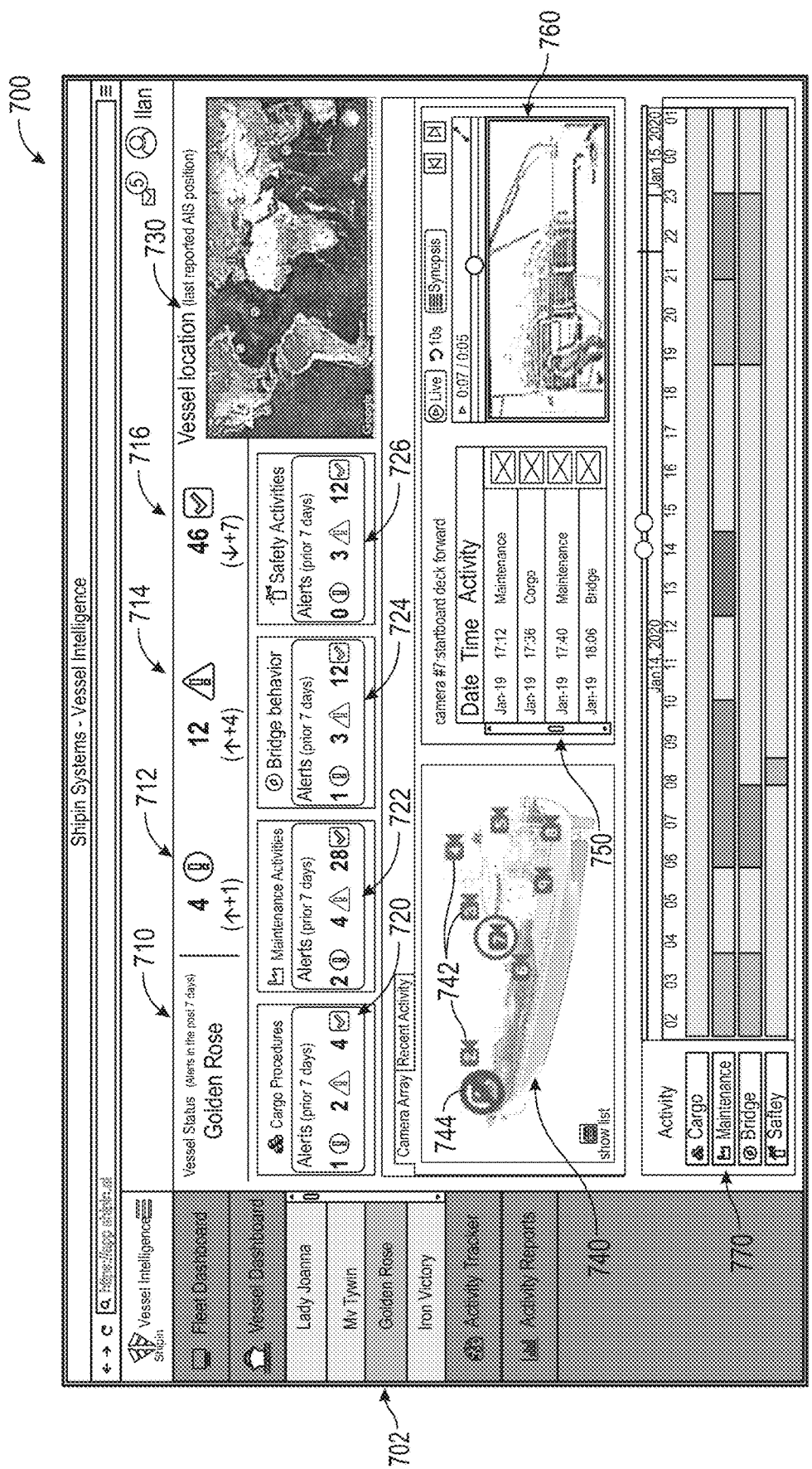
FIG. 7 is a diagram showing an exemplary GUI displayed by a processor and associated process in the system and method of FIG. 1, depicting an exemplary dashboard of vessel activity, including current status and performance.

FIG. 7 shows a display 700 of vessel status and performance that can be selected from the main fleet dashboard 600, or another mechanism. The exemplary status box 710 in the upper right of the display 700 allows selection of the vessel from a menu 702, and contains the selected vessel name or identifier, along with the respective number of alarms 712, warnings 714 and all clear conditions 716. Status conditions for cargo 720, maintenance 722, bridge behavior 724, and safety precautions 726. A map 730 shows vessel location. A 3D projection, which can be manipulated for orientation and zoom, shows event locations with identifiers 742 related to sensors/cameras, and highlights 744 of locations with alerts/alarms. Selecting a particular sensor/camera can bring up status data for present and past activity in central listing 750. The image display window 760 shows the images and sequences associated with the sensor/camera. This can be manipulated using appropriate buttons. A graph or heat map 760 shows activities and status for the different categories relative to the selected vessel.

Figure 8:
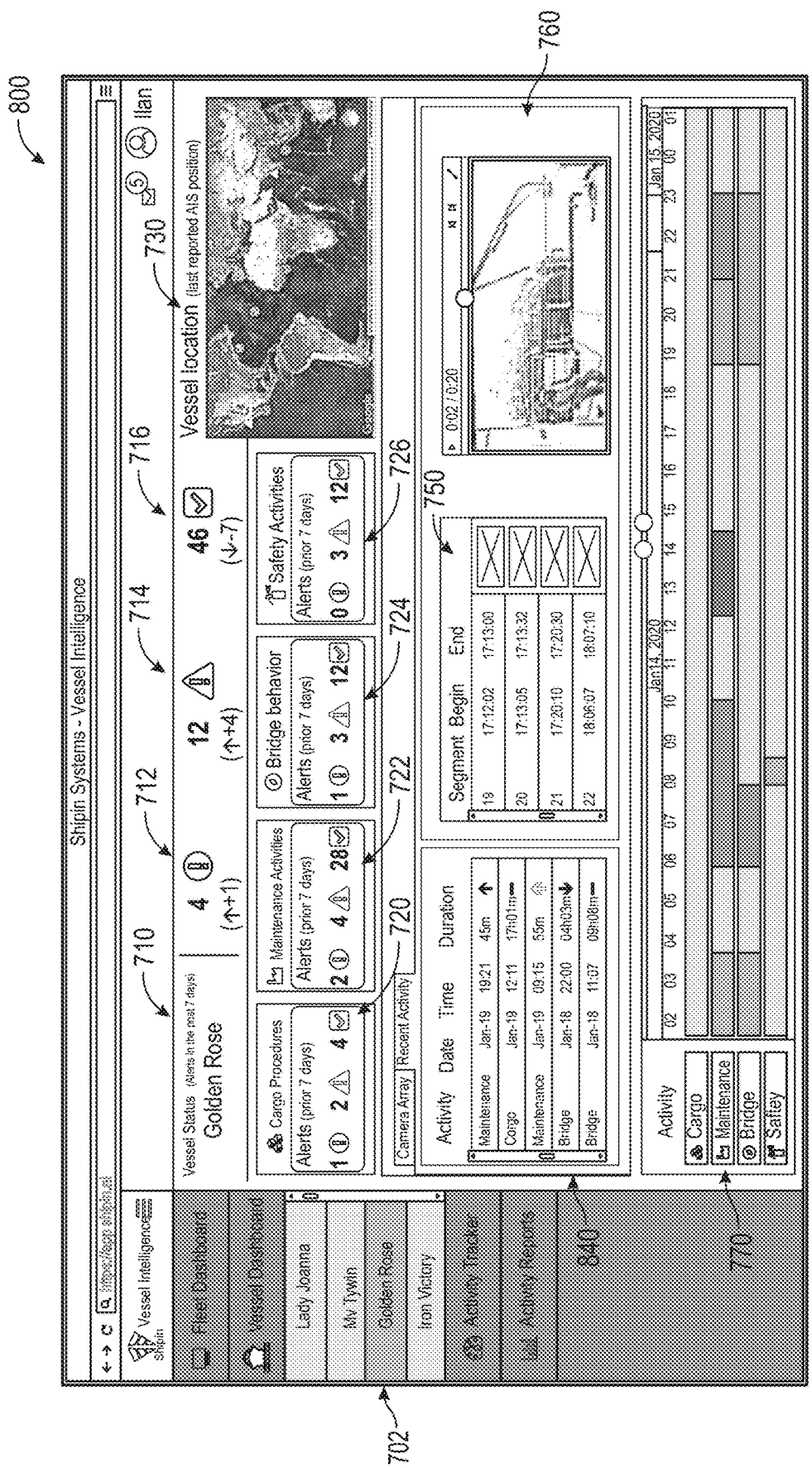
FIG. 8 is a diagram showing an exemplary GUI displayed by a processor and associated process in the system and method of FIG. 1, depicting an another exemplary dashboard of vessel activity, including current status and performance.

FIG. 8 shows an additional view of the vessel dashboard display 800 based upon the above-described display 700 and exemplary information provided therein. Thus, similar, exemplary display elements have been similarly numbered. The camera array window 740 in display 700 has been toggled to reveal a recent activity window 840 showing activity (e.g. maintenance, cargo, bridge or safety), date, time and duration.

B. Event Tracking

Figure 9:
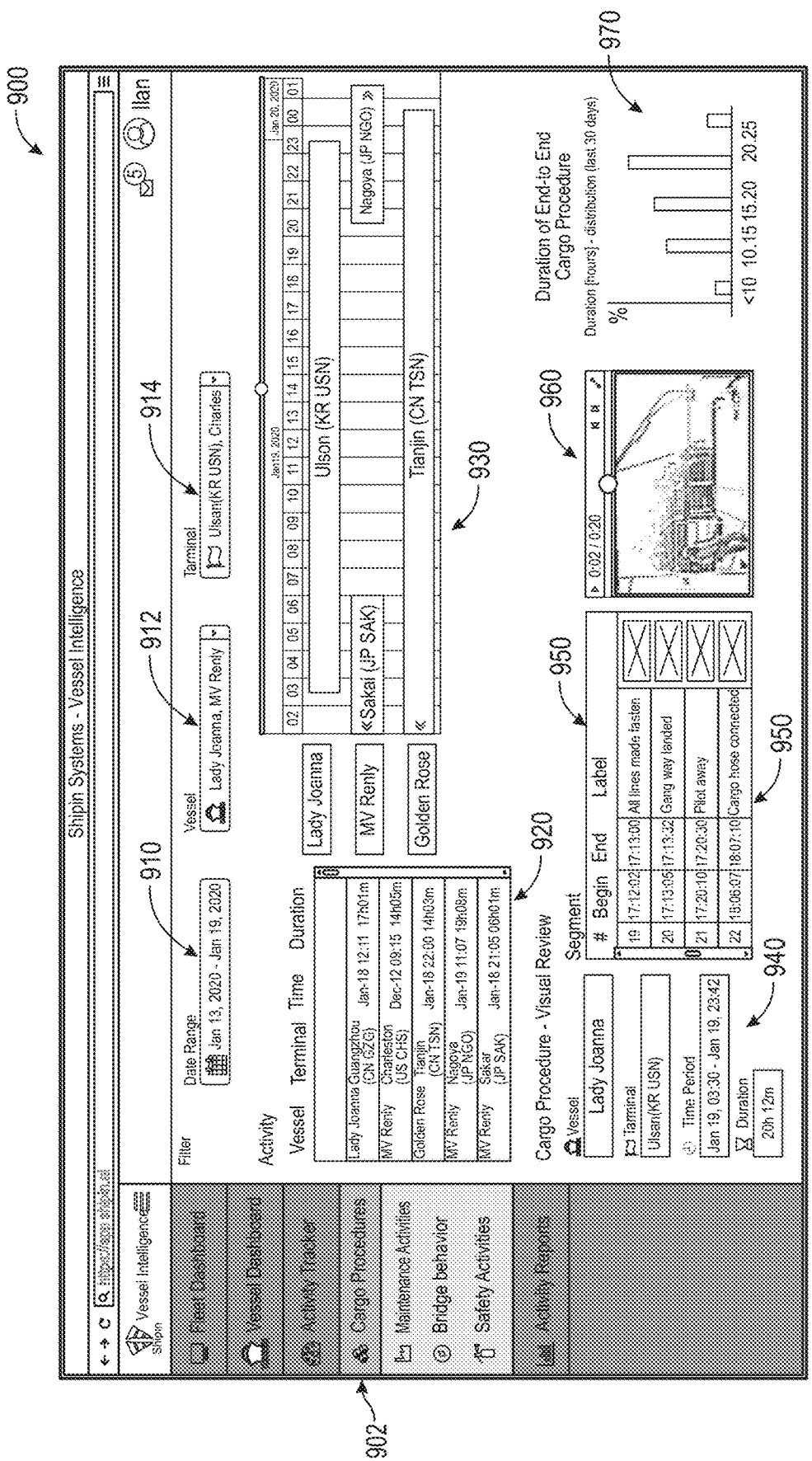
FIG. 9 is a diagram showing an exemplary GUI displayed by a processor and associated process in the system and method of FIG. 1, depicting an exemplary dashboard for cargo procedure tracking on a vessel.

FIGS. 9-12 show respective displays 900, 1000, 1100 and 1200 that can be accessed via the activity tracker side menu 902, which can allow the user to track various activities with respect to multiple vessels. FIG. 9 particularly shows a display 900 that allows tracking of cargo operations. It includes filter boxes to allow selection of a tracking date range 910, the relevant vessel 912 and cargo terminal 914. An activity box 920 with vessel, terminal, time and duration is shown. The time duration for various vessel cargo activities is further shown in a comparative bar graph 930. Cargo procedure visual review settings 940 are also provided. Durations of specific cargo procedures (e.g. gangway operated, hose connected, etc.) are shown in segments window 950. Visual events relevant to a cargo activity can be displayed in the window 960. A bar graph (histogram) 970 also shows comparative time durations over a series of days or weeks.

Figure 10:
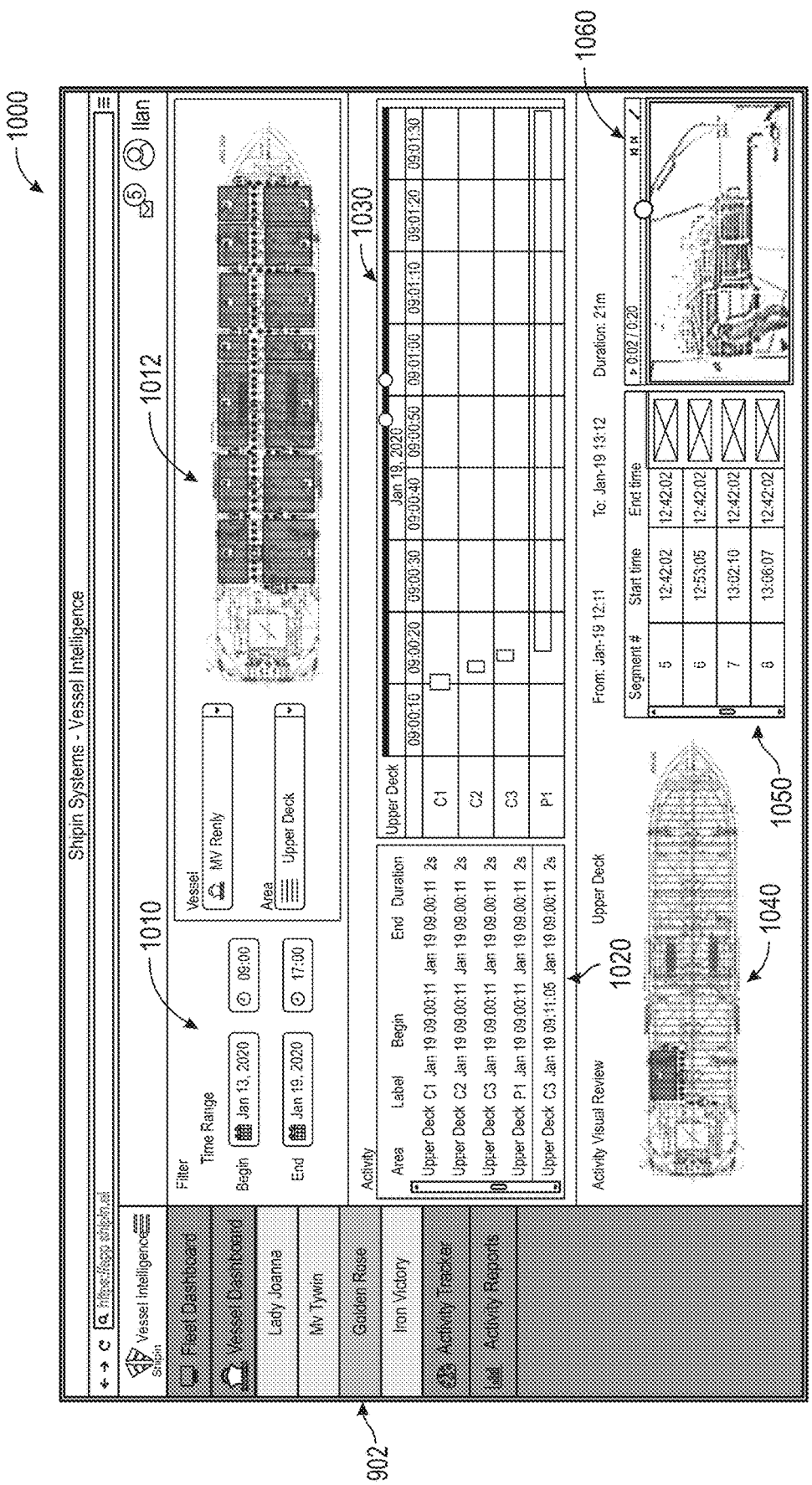
FIG. 10 is a diagram showing an exemplary GUI displayed by a processor and associated process in the system and method of FIG. 1, depicting an exemplary dashboard for maintenance activity tracking on a vessel.

FIG. 10 shows a maintenance activities tracking display 1000. It includes a filter 1010 for time and map 1012 showing a representation of the selected vessel and locations thereon being tracked. An activity window 1020 shows the area of interest as well as the time start, end and duration. A time log 1030 shows comparative area activities over time as a series of bars. The activity location is also shown on a ship representation in window 1040. A visual activity segment window 1050 is provided and allows selection of visual maintenance events for display in window 1060.

Figure 11:
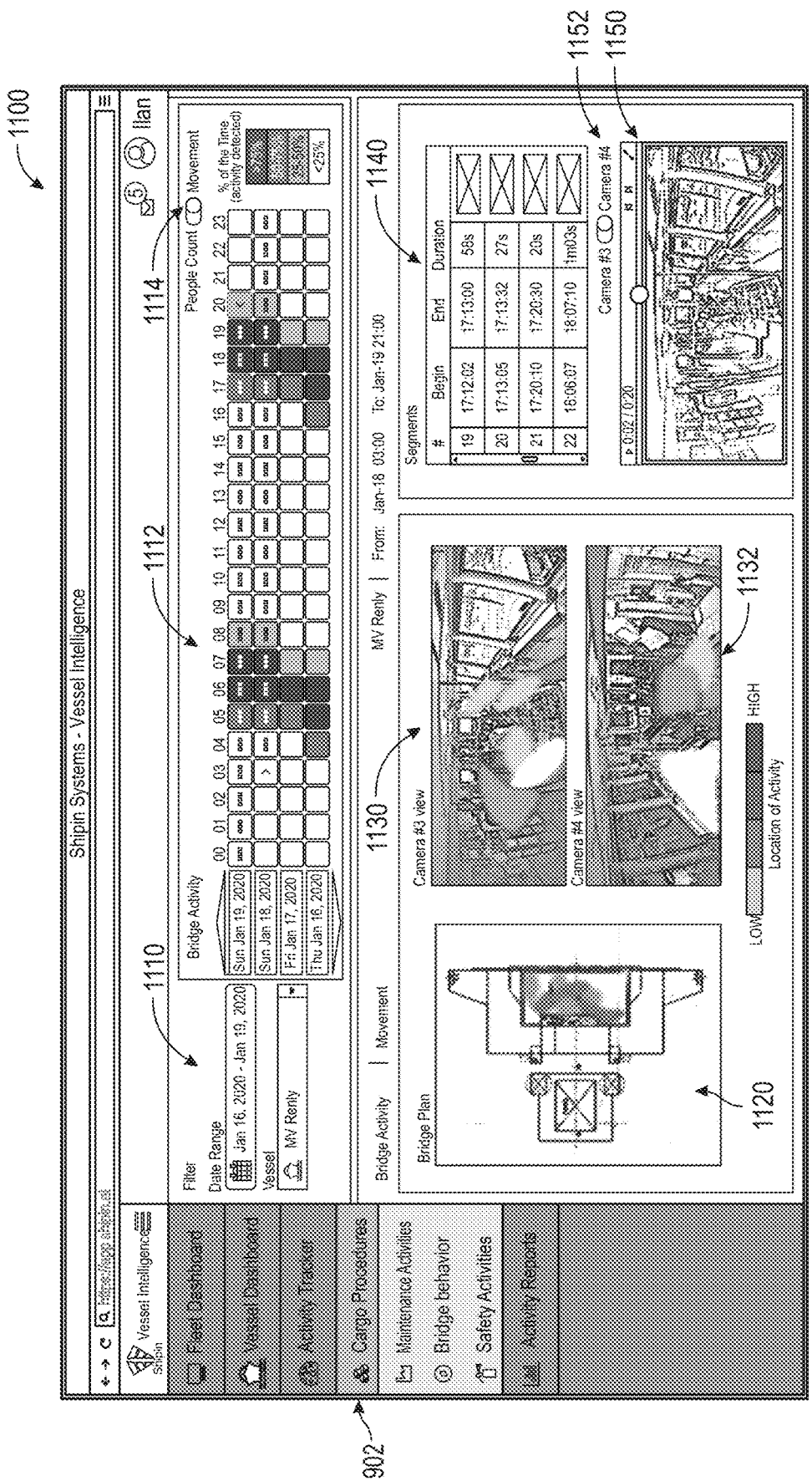
FIG. 11 is a diagram showing an exemplary GUI displayed by a processor and associated process in the system and method of FIG. 1, depicting an exemplary dashboard for bridge activity/behavior tracking on a vessel.

FIG. 11 shows a bridge behavior/activity tracking display 1100 with an associated date range and vessel name filter 1110. A chart 1112, which can be shaded or color-coded, based upon level of activity is shown for a given date range and time block. The activity can be selected for personnel count or personnel movement based upon a selection switch 1114. A map 1120 showing the vessel's bridge floorplan/layout is depicted with a heat map that is color-coded or shaded based upon level of motion or personnel density (as selected above). This heat map can be projected into a three dimensional image from a particular bridge-based sensor/camera as shown in windows 1130 and 1132. An activity segment window 1140 is also provided, which allows selection of a visual event displayed in window 1150. A particular sensor/camera can be selected for display with switch 1152.

Figure 12:
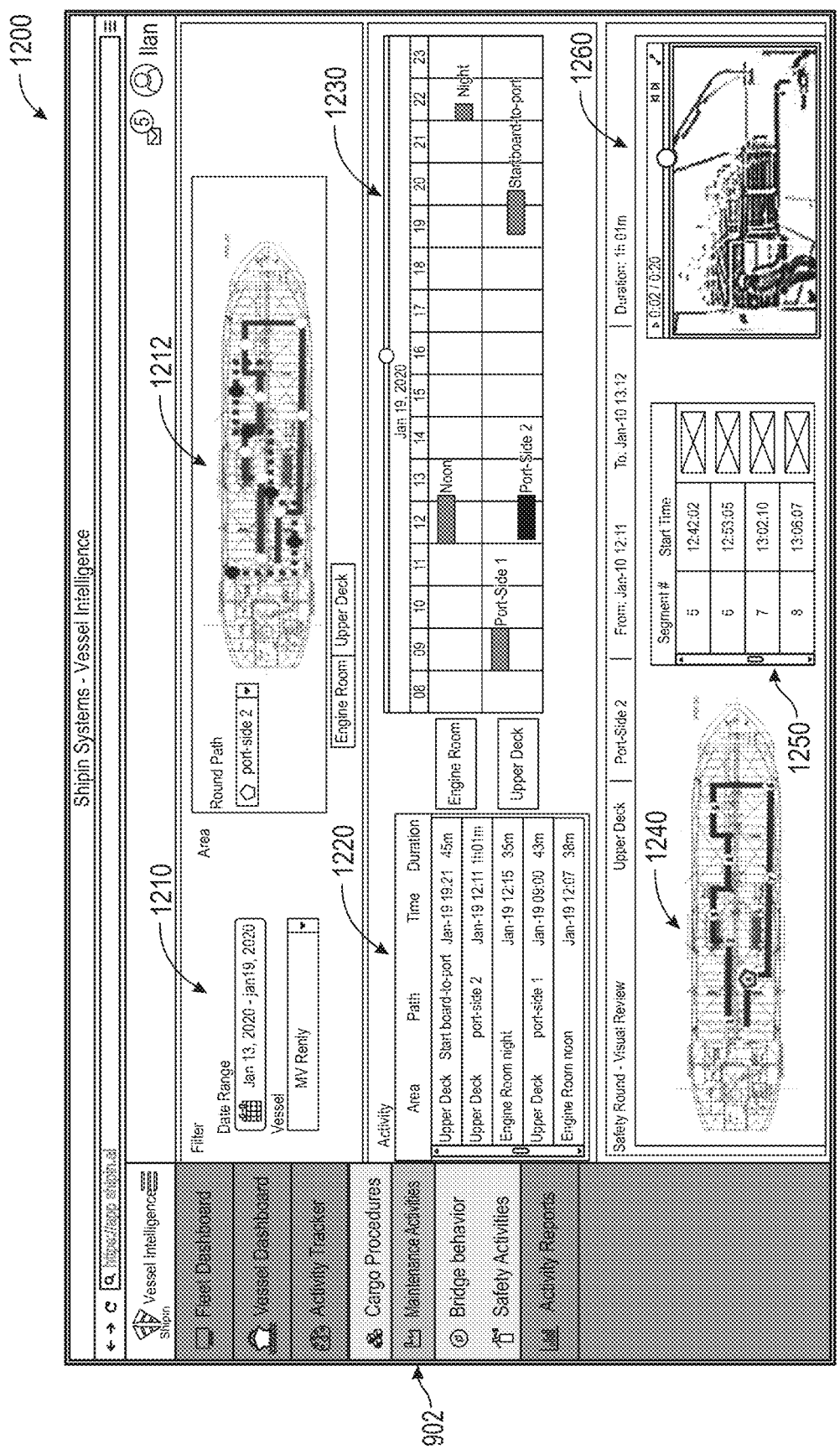
FIG. 12 is a diagram showing an exemplary GUI displayed by a processor and associated process in the system and method of FIG. 1, depicting an exemplary dashboard for safety status and procedure tracking on a vessel.
Figure 13:
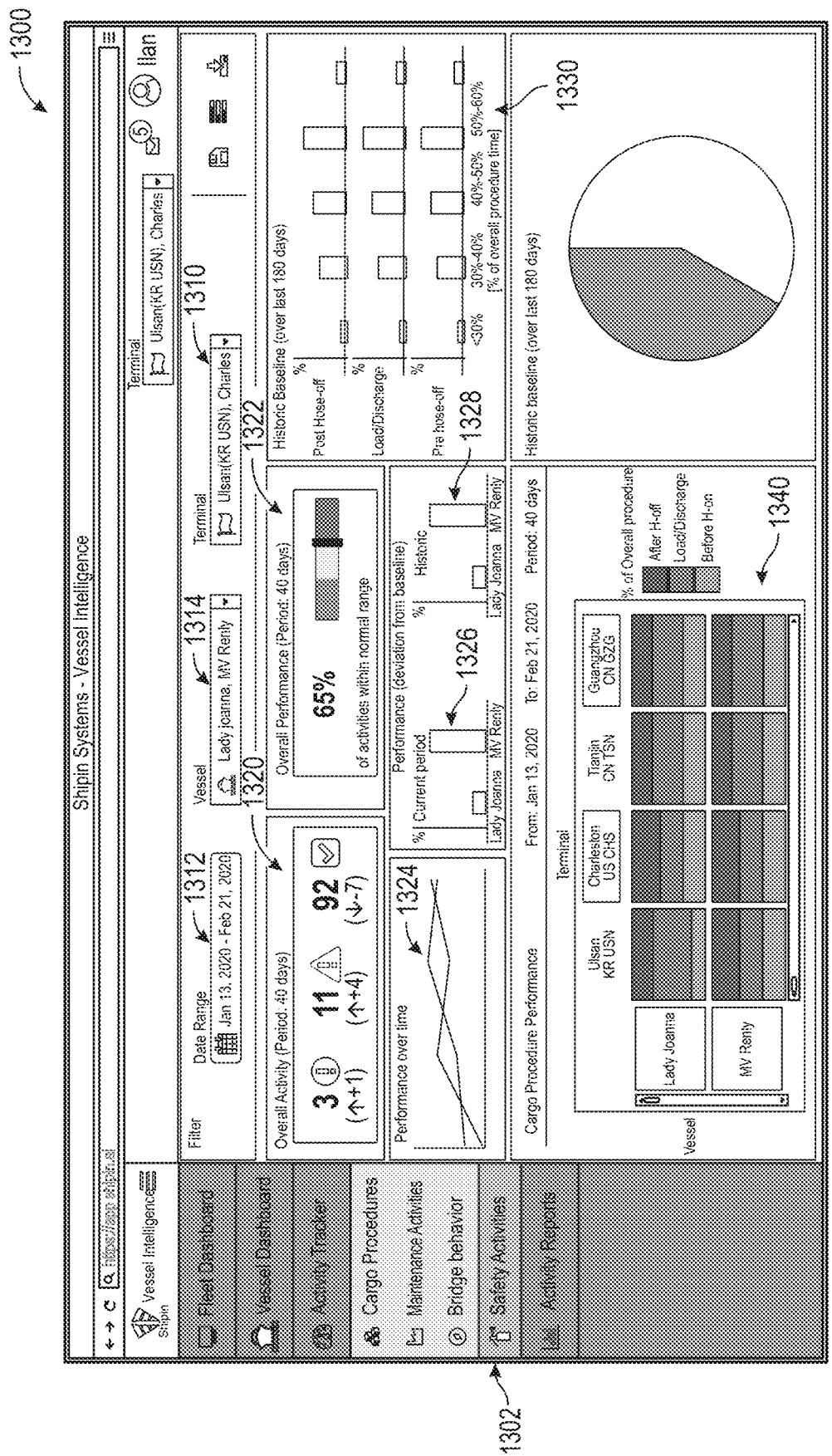
FIG. 13 is a diagram showing an exemplary GUI displayed by a processor and associated process in the system and method of FIG. 1, depicting an exemplary dashboard for cargo procedure reporting on a vessel.

FIG. 12 shows a safety tracking display 1200 with associated time filter 1210 as vessel map that allows selection of safety rounds and points of interest in specific areas, such as the upper deck (and port side, starboard side, etc.) or engine room. An activity window 1220 provides area, safety round path, time and duration information. A bar graph 1230 shows activities in selected areas (e.g. upper deck and engine room) over time. A visual review 1240 depicts a map of the vessel's selected floorplan (e.g. upper deck) and sub-area (e.g. port side, starboard side) with a map of rounds and associated sensor/camera locations. A segment window 1250 also allows selection of visual events for display on the window 1260.

C. Reports

FIGS. 13-16 show respective displays for reports related to cargo procedures 1300, maintenance activities 1400, bridge behavior/activities 1500 and safety 1600. A side menu 1302 allows for selection of reports. Such reports can be generated to provide subsequent data to the user and management so that baselines can be established and decisions on personnel management, rules and operations can be made. Referring to the display 1300 in FIG. 13, a selection box allows filtering based upon a particular terminal locations 1310, date range 1312 and vessels 1314. Overall activity 1320 is listed with associated alarms, warnings and all clear statistics. Overall performance 1322 is also listed with an associated bar graph. A plot graph 1324 and histograms 1326, 1328 can also be displayed to chart various performance parameters as shown. A historic baseline chart of performance is also displayed in window 1330. A comparative chart (shaded or color coded) of two or more vessels in the fleet is depicted in window 140. The historic baseline can also be displayed as a pie chart 1350. Note that any acceptable graphic or display of statistics can be provided in further embodiments for this and other reports herein provided that the appropriate statistics and information to generate such a report exist. These reports can be generated using appropriate computational techniques that should be clear to those of skill.

Figure 14:
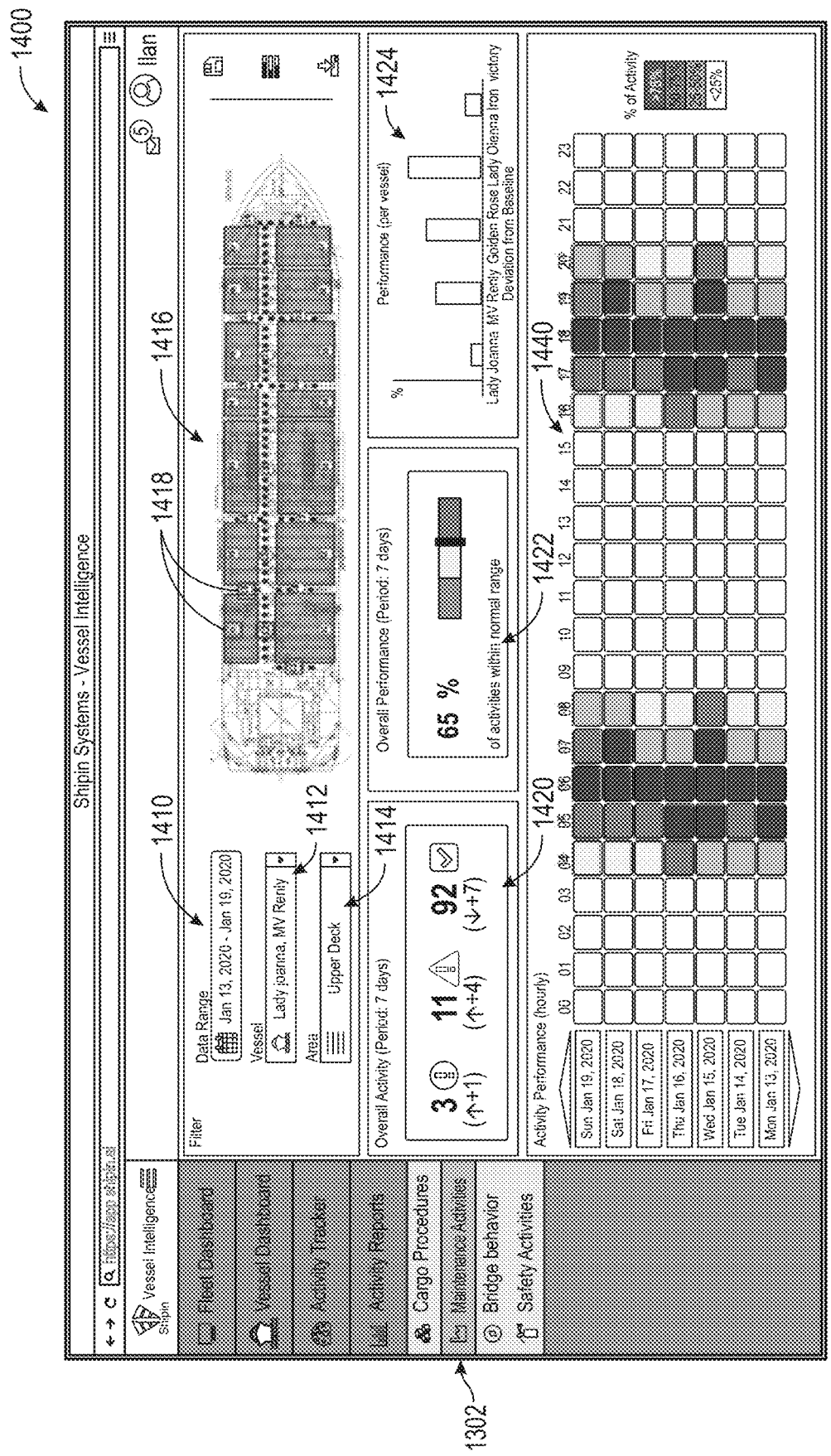
FIG. 14 is a diagram showing an exemplary GUI displayed by a processor and associated process in the system and method of FIG. 1, depicting an exemplary dashboard for maintenance activity reporting on a vessel.

FIG. 14 shows a display 1400 for a maintenance activities report with a filter for date range 1410, vessel 1412 and location (e.g. upper deck, engine room, etc.) 1414. A map 1416 of the associated vessel deck is shown with deck highlights 1418 of areas of interest. An overall activity box 1420 reports alarms, warnings and all clear conditions. An overall performance box 1422 includes a bar indicating level of performance. A bar graph (histogram) 1424 shows performance per vessel. An activity performance window 1440 plots hourly maintenance versus date range using a color-coded or shaded scale to indicate level of activity.

Figure 15:
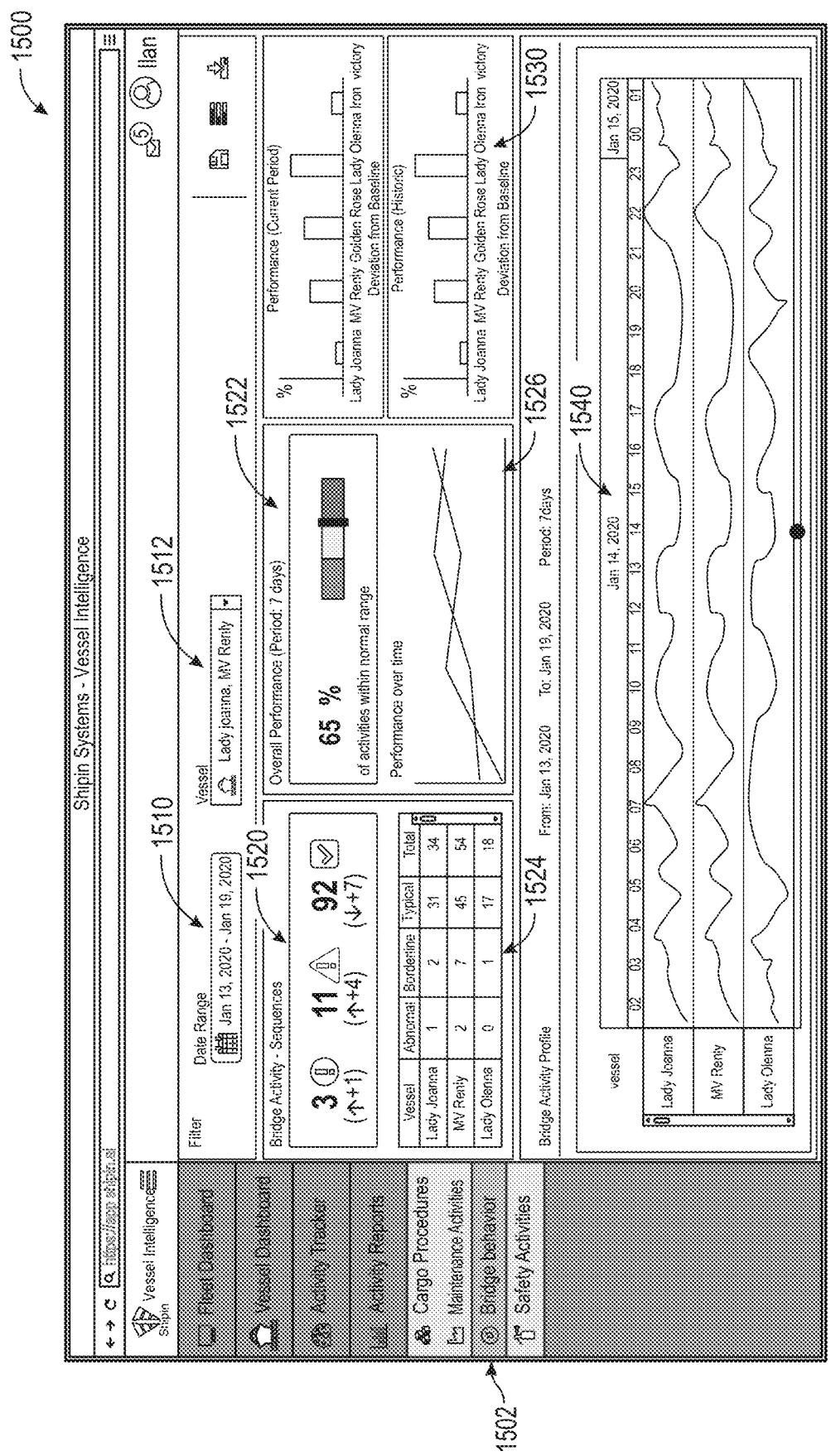
FIG. 15 is a diagram showing an exemplary GUI displayed by a processor and associated process in the system and method of FIG. 1, depicting an exemplary dashboard for bridge activity/behavior reporting on a vessel.

FIG. 15 shows a display 1500 for generating reports on bridge behavior/activity, which includes a filter for date range 1510 and at least one vessel 1512. The display provides a window showing bridge activity sequences with alarms, warnings and all clear conditions. A window 1522 with overall performance, based upon an indicator bar is also provided. A table 1524 can show comparative performance between vessels in a fleet and a plot 1526 of performance over time can be provided. Additionally, performance for each vessel currently and historically can be provided in bar graphs (histograms) 1530. A comparative plot 1540 of bridge activity versus time for a plurality of fleet vessels can be also be depicted.

Figure 16:
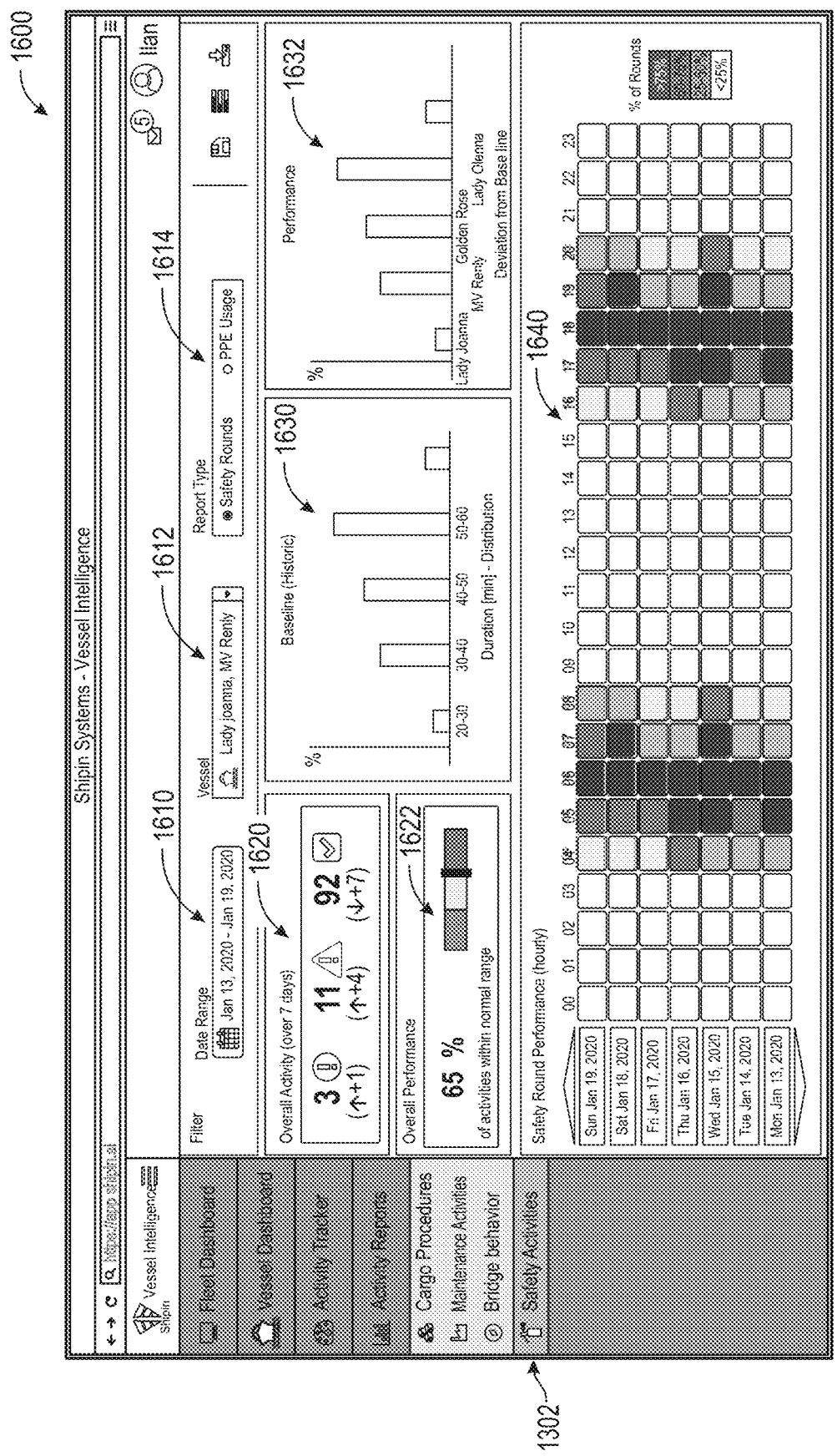
FIG. 16 is a diagram showing an exemplary GUI displayed by a processor and associated process in the system and method of FIG. 1, depicting an exemplary dashboard for safety status and procedure reporting on a vessel.

FIG. 16 shows a display 1600 for generating safety reports with associated filter based upon date range 1610, vessel 1612 and report type 1614 (for example, safety rounds, PPE usage, etc.). An overall activity window 1620 (e.g. over seven days) lists alarms, warnings and all clear conditions. An overall performance window with bar indicator 1622 is also provided. Baseline safety activity in groupings of minutes is shown in bar graph (histogram). Historical performance between vessels in a fleet is also shown in a bar graph 1632. A plot showing safety performance per hour for a range of dates is provided in window 1640 with activity color coded or shaded based upon level.

V. Conclusion

It should be clear that the above-described system and method effectively provides a user with meaningful information on the status and performance of various activities that are critical to safe and efficient operation of a vessel. This information includes relevant visual information that can be highly beneficial in understanding activities and providing evidence for follow-on analysis, etc. The system and method can operate to deliver meaningful visual and other information in near real time over small bandwidth communication channels. A graphical user interface can be provided to control the system and method, setting priorities, tracking and reporting activities as appropriate. The system and method can also be adapted to operate over larger bandwidth channels and/or with other types of remote locations—for example islands, subterranean/underground, arctic and Antarctic stations, space-based locations, etc.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software-based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for storage and bandwidth reduction of visual events in association with an activity comprising:

at least one visual event detector having at least one camera that acquires images of the activity, at least one processor receiving the images and a visual event detection process operating at least in part on the processor that processes the images;

a queuing process that identifies the visual events from the at least one visual event detector and stores the visual events; and a communications process that enables a reduced-bandwidth communications channel adapted to transmit the stored visual events in a reduced-bandwidth and queued format to a remote location, wherein the visual events comprise activities related to at least one of bridge operations, cargo operations, maintenance operations, safety operations, and vetting and security with respect to a vessel, and wherein the visual events are based upon software-based and hardware-based event detectors that identify predetermined characteristics within one or more of the images and determine a state based upon the characteristics.

2. The system as set forth in claim 1 wherein the visual events provide data primitives that are derived into user information, the data primitives including at least one of statistics, pattern matches, metrics and time.

3. The system as set forth in claim 2 wherein the stored visual events are communicated across the reduced-bandwidth communications channel based upon user-set priorities, wherein higher priority events are communicated first in a queue from the stored visual events.

4. The system as set forth in claim 3 further comprising a user interface that displays information of the at least one of the bridge operations, cargo operations, maintenance operations, safety operations, and vetting and security at a base location in one or more predetermined presentation formats.

5. The system as set forth in claim 4 wherein the user interface includes inputs that enable the user-set priorities.

6. The system as set forth in claim 4 wherein the user-interface includes inputs that enable adding or setting configuration parameters for the software-based and hardware-based event detectors.

7. The system as set forth in claim 4 wherein the user information includes at least one of fleet reports on a plurality of vessels associated with the user interface, vessel reports, occurrence of discrete events and occurrence of complex events comprising a plurality of discrete events.

8. The system as set forth in claim 7 wherein the information is displayed in a dashboard format comprising one or more visual windows, alerts and numerical data.

9. A user interface operated by a base location processor located at a base location and receiving visual events over a communication channel from a remote, moving or stationary object, in which the object includes at least one visual event detector having at least one camera that acquires images of an activity, at least one object processor receiving the images and a visual event detection process operating at least in part on the object processor that processes the images and a communications process that enables the communication channel adapted to transmit stored visual events in queued format to the base location, the user interface comprising:

a dashboard display for displaying information associated with the object and enables configurations of at least one of (a) priority of visual events to be communicated over the communications channel and (b) configuration of characteristics associated with the visual events, wherein the visual events comprise activities related to at least one of bridge operations, cargo operations, maintenance operations, safety operations, and vetting and security with respect to a vessel, and wherein the visual events are based upon software-based and hardware-based event detectors that identify predetermined characteristics within one or more of the images and determine a state based upon the characteristics.

10. The user interface as set forth in claim 9 wherein the communications channel is a reduced-bandwidth, wireless communications channel.

11. The user interface as set forth in claim 10 wherein the object is a sea-going vessel and the visual events relate to at least one of safety, maintenance, cargo handling, bridge operations, and vetting and security relative to the sea-going vessel.

12. The user interface as set forth in claim 11, wherein the dashboard display on the user interface provides at least one of configuration, status and performance information relative to the sea-going vessel.

13. The user interface as set forth in claim 12 wherein the dashboard display on the user interface provides at least one of configuration, status and performance information relative each vessel of a fleet of vessels.

14. The user interface as set forth in claim 11 wherein the information includes one or more forms of displayed sensor data having at least one of a label, highlight, comment and annotation visually appended thereto.

15. The user interface as set forth in claim 11 wherein the information includes a workflow provided between one or more users or vessels.

16. The user interface as set forth in claim 11 wherein the communication channel is arranged to transmit control data from the user interface to one or more vessels and receive feedback via the user interface relative to actions on the one or more vessels with respect to the control data.

17. A method for storage and bandwidth reduction of visual events in association with an activity comprising the steps of:

acquiring images of the activity with at least one camera and performing visual event detection with a processor;

identifying the visual events from software-based and hardware-based event detectors that identify predetermined characteristics within one or more of the images and determine a state based upon the characteristics and storing the visual events in a queue based upon predetermined parameters, wherein the visual events comprise activities related to at least one of bridge operations, cargo operations, maintenance operations, safety operations, and vetting and security with respect to a vessel; and communicating with a remote location over a reduced-bandwidth communications channel adapted to transmit the stored visual events in a reduced-bandwidth and queued format to the remote location.

\* \* \* \* \*